United States Patent
Minegishi

(10) Patent No.: US 10,246,083 B2
(45) Date of Patent: Apr. 2, 2019

(54) HYBRID VEHICLE

(71) Applicant: TOYOTA JIDOSHA KABUSHIKI KAISHA, Toyota-shi, Aichi-ken (JP)

(72) Inventor: Shinichiro Minegishi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 182 days.

(21) Appl. No.: 15/340,178

(22) Filed: Nov. 1, 2016

(65) Prior Publication Data

US 2017/0129478 A1    May 11, 2017

(30) Foreign Application Priority Data

Nov. 5, 2015  (JP) .................. 2015-217563

(51) Int. Cl.
*B60W 20/50* (2016.01)
*B60W 20/10* (2016.01)
(Continued)

(52) U.S. Cl.
CPC .............. *B60W 20/50* (2013.01); *B60K 6/365* (2013.01); *B60K 6/445* (2013.01); *B60K 6/547* (2013.01);
(Continued)

(58) Field of Classification Search
CPC ........ B60K 6/365; B60K 6/445; B60K 6/547; B60L 11/123; B60L 11/14; B60L 2210/30; B60L 2240/421; B60L 2240/441; B60L 2260/44; B60L 3/0061; B60L 3/12; B60W 20/10; B60W 20/50; B60W 2510/081; B60W 2510/1005; B60W 2710/083;
(Continued)

(56) References Cited

U.S. PATENT DOCUMENTS 6,696,812 B2 *   2/2004   Kaneko ............... B60L 11/1803
                                                  318/700
6,906,491 B2 *   6/2005   Matsuo ................... H02P 21/26
                                                  318/638
(Continued)

FOREIGN PATENT DOCUMENTS

JP  2002-136171   5/2002
JP  2007-244126   9/2007
JP  2008-245460   10/2008

*Primary Examiner* — Angelina Shudy
(74) *Attorney, Agent, or Firm* — Finnegan, Henderson, Farabow, Garrett & Dunner, LLP

(57) ABSTRACT

Using an estimated electric angle calculated by an electric angle estimation unit, a PWM control unit controls an output of a motor generator (MG2) having an abnormality of a resolver. The electric angle estimation unit converts, into an estimated rotation angle speed, a rotation speed of MG2 estimated from rotation speeds of an engine and a normal motor generator mechanically coupled to MG2. The estimated electric angle is calculated by correcting a sum of the estimated electric angle in a previous control period and an estimated electric angle change amount between the previous control period and a present control period obtained from the estimated rotation angle speed, with a calculated and estimated electric angle error. The electric angle error is estimated from a control command for an inverter and an actual current value detected by a current sensor.

4 Claims, 12 Drawing Sheets

(51) Int. Cl.
| | |
|---|---|
| *B60K 6/445* | (2007.10) |
| *B60L 11/14* | (2006.01) |
| *B60L 11/12* | (2006.01) |
| *B60K 6/365* | (2007.10) |
| *B60K 6/547* | (2007.10) |
| *B60L 3/00* | (2019.01) |
| *B60L 3/12* | (2006.01) |

(52) U.S. Cl.
CPC .............. *B60L 11/123* (2013.01); *B60L 11/14* (2013.01); *B60W 20/10* (2013.01); *B60L 3/0061* (2013.01); *B60L 3/12* (2013.01); *B60L 2210/30* (2013.01); *B60L 2240/421* (2013.01); *B60L 2240/441* (2013.01); *B60L 2260/44* (2013.01); *B60W 2510/081* (2013.01); *B60W 2510/1005* (2013.01); *B60W 2710/083* (2013.01); *B60Y 2200/92* (2013.01); *B60Y 2306/13* (2013.01); *B60Y 2400/112* (2013.01); *B60Y 2400/61* (2013.01); *B60Y 2400/73* (2013.01); *Y10S 903/906* (2013.01); *Y10S 903/911* (2013.01); *Y10S 903/919* (2013.01)

(58) Field of Classification Search
CPC ............ B60Y 2200/92; B60Y 2306/13; B60Y 2400/112; B60Y 2400/61; B60Y 2400/73; Y10S 903/906; Y10S 903/911; Y10S 903/919
USPC .......................................................... 701/22
See application file for complete search history.

(56) References Cited

U.S. PATENT DOCUMENTS

| | | | | |
|---|---|---|---|---|
| 8,203,297 B2* | 6/2012 | Kondo | ...................... | H02P 6/16 318/400.01 |
| 8,471,506 B2* | 6/2013 | Manabe | ..................... | H02P 6/16 318/400.02 |
| 8,474,570 B2* | 7/2013 | Yanai | ..................... | B62D 5/046 180/443 |
| 8,872,511 B2* | 10/2014 | Manabe | ............... | G01D 5/2073 324/207.25 |
| 9,203,332 B2* | 12/2015 | Yamada | ................ | B60L 3/0038 |
| 9,475,520 B2* | 10/2016 | Yanai | ..................... | G01D 5/145 |
| 9,682,693 B2* | 6/2017 | Amano | ................. | B60W 20/10 |
| 9,712,090 B2* | 7/2017 | Yamada | ............. | H02M 3/1584 |
| 9,994,215 B2* | 6/2018 | Takakura | ............. | B60W 20/50 |
| 10,000,123 B2* | 6/2018 | Hori | ..................... | B60L 3/0046 |
| 2004/0149247 A1* | 8/2004 | Kataoka | ................ | F02N 11/006 123/179.4 |
| 2004/0153235 A1* | 8/2004 | Kataoka | ................ | B60K 6/485 701/112 |
| 2004/0257027 A1* | 12/2004 | Matsuo | ................... | H02P 21/26 318/722 |
| 2005/0209752 A1* | 9/2005 | Ono | ....................... | B62D 5/008 701/41 |
| 2008/0297078 A1* | 12/2008 | Iwasaki | .................. | H02P 21/22 318/400.02 |
| 2009/0026004 A1* | 1/2009 | Hidaka | ................. | B62D 5/008 180/446 |
| 2009/0076707 A1* | 3/2009 | Sugiyama | ............ | F02D 41/123 701/103 |
| 2010/0207475 A1* | 8/2010 | Kawasaki | ............ | G01D 5/2046 310/156.08 |
| 2011/0043146 A1* | 2/2011 | Sato | ......................... | H02P 6/12 318/400.04 |
| 2011/0173469 A1* | 7/2011 | Minegishi | ................ | B60K 6/48 713/320 |
| 2011/0307136 A1* | 12/2011 | Komata | ................. | B60K 6/365 701/22 |
| 2012/0013182 A1* | 1/2012 | Minegishi | ............. | B60W 20/10 307/9.1 |
| 2012/0211299 A1* | 8/2012 | Yanai | ..................... | B62D 5/046 180/446 |
| 2012/0241233 A1* | 9/2012 | Suzuki | ................. | B60K 7/0007 180/65.6 |
| 2013/0033207 A1* | 2/2013 | Satou | ..................... | B62D 5/046 318/400.04 |
| 2013/0138300 A1* | 5/2013 | Hayama | .................. | B62D 6/00 701/43 |
| 2014/0019009 A1* | 1/2014 | Kogiso | .............. | B62D 15/0235 701/42 |
| 2014/0111130 A1* | 4/2014 | Yamada | ................ | B60L 3/0038 318/400.32 |
| 2014/0327424 A1* | 11/2014 | Masuda | .................. | B60L 1/006 323/318 |
| 2014/0336878 A1* | 11/2014 | Yanai | ..................... | G01D 5/145 701/41 |
| 2015/0258897 A1* | 9/2015 | Okada | ...................... | B60L 7/14 318/376 |
| 2015/0369152 A1* | 12/2015 | Nakagawa | .......... | F02D 41/0085 123/445 |
| 2016/0152128 A1* | 6/2016 | Minegishi | ............ | B60W 10/06 180/65.265 |
| 2016/0153419 A1* | 6/2016 | Minegishi | ........... | F02N 11/0866 290/38 C |
| 2017/0267102 A1* | 9/2017 | Hori | ...................... | B60L 3/0046 |
| 2017/0267231 A1* | 9/2017 | Takakura | .............. | B60W 20/50 |
| 2018/0093702 A1* | 4/2018 | Nampei | .................. | H02P 6/16 |
| 2018/0134280 A1* | 5/2018 | Takakura | ............... | B60W 20/50 |
| 2018/0281596 A1* | 10/2018 | Arakawa | ............... | B60L 3/0061 |

\* cited by examiner

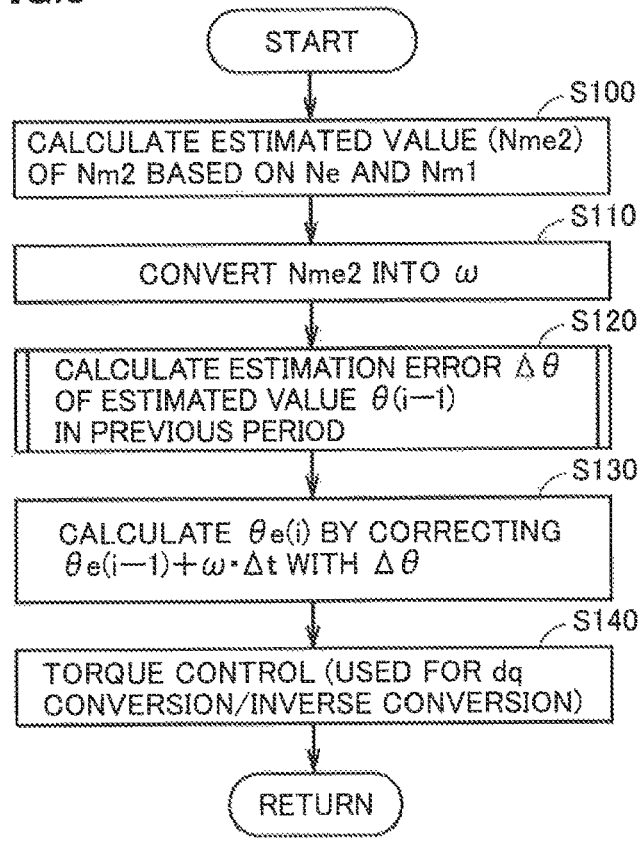
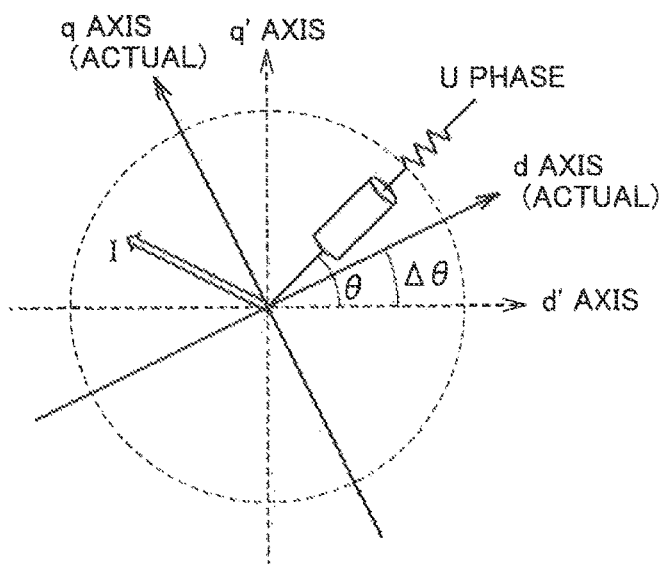

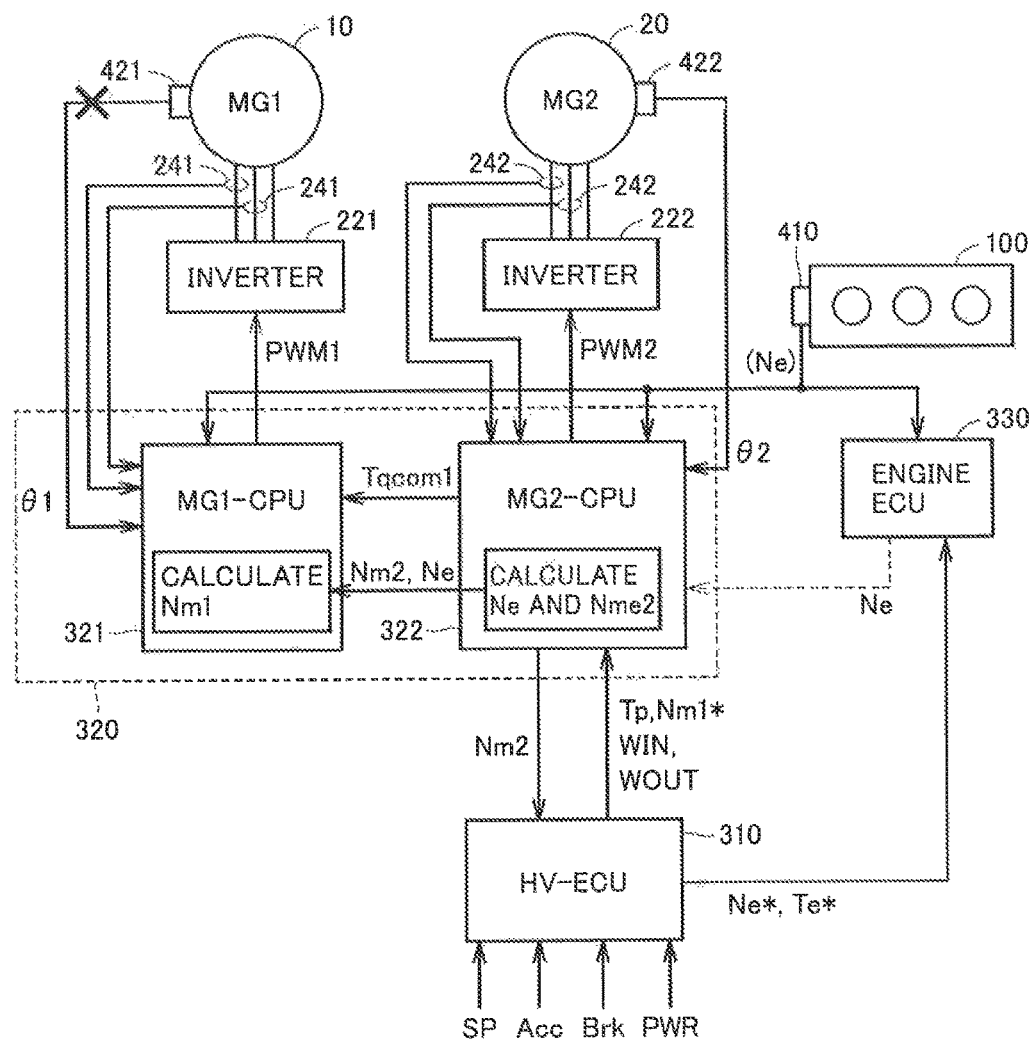

HYBRID VEHICLE

This nonprovisional application is based on Japanese Patent Application No. 2015-217563 filed on Nov. 5, 2015 with the Japan Patent Office, the entire contents of which are hereby incorporated by reference.

BACKGROUND OF THE INVENTION

Field of the Invention

The present invention relates to a hybrid vehicle, and more particularly to control when an abnormality occurs in a rotation angle sensor provided to a motor generator for driving the vehicle.

Description of the Background Art

As one embodiment of a powertrain configuration for a hybrid vehicle, Japanese Patent Laying-Open No. 2007-244126 and the like describe a configuration in which an engine, a first motor generator (MG1) and a second motor generator (MG2) are coupled by a planetary gear device.

Japanese Patent Laying-Open No. 2007-244126 describes limp home running when a resolver provided to one of first and second motor generators becomes inoperative. For example, when the resolver of the second motor generator (MG2) becomes inoperative, driving of an inverter configured to control the second motor generator (MG2) having the abnormality of the resolver is stopped and the motive power provided from an engine and the normal first motor generator (MG1) is input to a power split device (planetary gear mechanism), to thereby realize the limp home running.

Furthermore, Japanese Patent Laying-Open No. 2007-244126 describes that when the resolver provided to the first motor generator (MG1) becomes inoperative, driving of an inverter configured to control the first motor generator (MG1) having the abnormality of the resolver is stopped and the limp home running is performed using an output of the normal second motor generator (MG2).

SUMMARY OF THE INVENTION

However, in the limp home running described in Japanese Patent Laying-Open No. 2007-244126, the inverter for one motor generator having the abnormality of the resolver is shut down and the torque output is prohibited, and thereby, running of the vehicle is continued. As a result, the following problems may arise.

First, in the limp home running when the abnormality occurs in the resolver of the second motor generator (MG2), the normal first motor generator (MG1) continuously outputs the negative torque involving power generation and the vehicle driving force is thereby obtained, whereas the electric power is not consumed by the second motor generator (MG2) having the abnormality of the resolver. As a result, charging of a power storage device is promoted, and thus, it is concerned that the running distance is limited depending on a charging margin of the power storage device. In addition, the torque (negative torque) for regenerative braking cannot be generated from the second motor generator (MG2), either, and thus, it is also concerned that continuation of running is limited by an overload of a mechanical brake (e.g., friction brake).

On the other hand, in the limp home running when the abnormality occurs in the resolver of the first motor generator (MG1), the normal second motor generator (MG2) continuously outputs the positive torque and the vehicle driving force is thereby obtained, whereas the first motor generator (MG1) having the abnormality of the resolver cannot output the torque, and thus, power generation using the engine output cannot be performed. As a result, discharging of the power storage device is promoted, and thus, it is concerned that the running distance is limited depending on a discharging margin of the power storage device.

The present invention has been made to solve the foregoing problems, and an object of the present invention is to, in a hybrid vehicle configured such that first and second motor generators and an engine are mechanically coupled by a planetary gear device, increase the running distance when an abnormality occurs in a rotation angle sensor provided to one motor generator.

A hybrid vehicle according to one embodiment includes: an engine; first and second motor generators each including a rotor provided with a permanent magnet; an output shaft; a planetary gear device; first and second current sensors; first and second rotation angle sensors; a rotation detection sensor provided to a crankshaft of the engine; first and second inverters; a power storage device; and a control device. The output shaft is mechanically connected to drive wheels. The planetary gear device mechanically couples the crankshaft of the engine, the rotor of the first motor generator and the output shaft. The rotor of the second motor generator is mechanically connected to the output shaft. The first and second rotation angle sensors are provided to the first and second motor generators, respectively. The first and second current sensors are provided to the first and second motor generators, respectively. The first and second inverters are configured to control an output of the first motor generator and an output of the second motor generator, respectively. The power storage device is configured to transmit and receive electric power to and from the first and second motor generators through the first and second inverters. The control device is configured to, in a running mode in which an abnormality occurs in one rotation angle sensor of the first and second rotation angle sensors and the other rotation angle sensor is normal during running of the vehicle, control the output of one motor generator of the first and second motor generators which corresponds to the one rotation angle sensor. The control device is configured to, during running of the vehicle: (i) periodically calculate an estimated rotation angle speed of the one motor generator based on a gear ratio in the planetary gear device, a detected value of the rotation detection sensor, and a detected value of the other rotation angle sensor; (ii) periodically calculate an estimated electric angle by integrating an estimated rotation angle change amount calculated from the estimated rotation angle speed; and (iii) periodically generate a control command for one inverter of the first and second inverters which corresponds to the one motor generator, by use of the estimated electric angle. The estimated electric angle is calculated in each period by correcting a sum of the estimated electric angle in a previous period and the estimated rotation angle change amount between the previous period and a present period, with an electric angle error calculated and estimated from the control command for the one inverter and a current value detected by one current sensor of the first and second current sensors which is provided to the one motor generator.

With such a configuration, in the hybrid vehicle configured such that the first and second motor generators and the engine are coupled by the planetary gear device, it is possible to increase the running distance when an abnormality occurs in the rotation angle sensor provided to one motor generator.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flowchart for describing a control process by an electric angle estimation unit shown in FIG. 7.

FIG. 9 is a conceptual diagram for describing a principle of calculation of an electric angle estimation error.

FIG. 14 is a functional block diagram for describing a distributed arrangement configuration of ECUs corresponding to the resolverless control according to the third embodiment.

DESCRIPTION OF THE PREFERRED EMBODIMENTS

Figure 1:
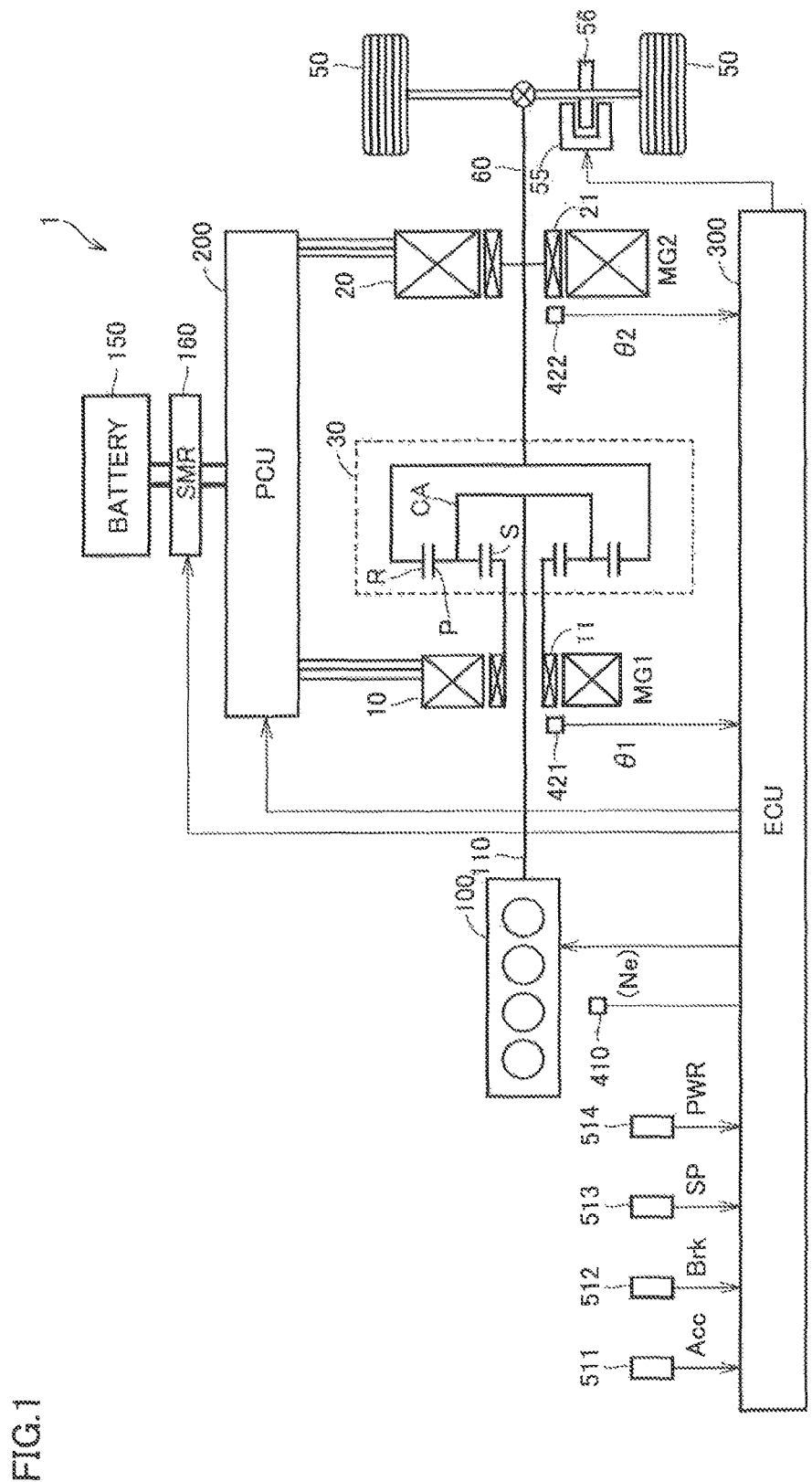
FIG. 1 is a block diagram schematically showing an overall configuration of a hybrid vehicle according to the present embodiment.

Embodiments of the present invention will be described in detail hereinafter with reference to the drawings, in which the same or corresponding portions are denoted by the same reference characters and description thereof will not be repeated in principle.

First Embodiment (Configuration of Hybrid Vehicle)

FIG. 1 is a block diagram schematically showing an overall configuration of a hybrid vehicle according to the present embodiment.

Referring to FIG. 1, a vehicle 1 includes an engine 100, motor generators 10 and 20, a planetary gear mechanism 30, drive wheels 50, an output shaft 60 connected to drive wheels 50, a battery 150 forming "power storage device", a system main relay (SMR) 160, a power control unit (PCU) 200, and an electronic control unit (ECU) 300.

As described in detail later, vehicle 1 can switch the running mode of vehicle 1 between electric vehicle running (EV running) during which engine 100 is stopped and the motive power of only motor generator 20 is used, and hybrid vehicle running (HV running) during which engine 100 is actuated and the motive power of both engine 100 and motor generator 20 is used.

Engine 100 is an internal combustion engine that converts the thermal energy by fuel combustion into the mechanical energy. In accordance with a control signal provided from ECU 300, engine 100 generates the motive power for causing vehicle 1 to run as the rotation force of a crankshaft 110. Crankshaft 110 is connected to planetary gear mechanism 30.

Engine 100 is provided with a rotation detection sensor 410 for detecting a rotation position (crank angle) of crankshaft 110. A signal indicating the result of detection by rotation detection sensor 410 is output to ECU 300. Based on a speed of change in the rotation position detected by rotation detection sensor 410, engine rotation speed Ne which is a rotation speed of engine 100 can be detected.

Each of motor generators 10 and 20 is formed by, for example, a three-phase AC permanent magnet-type synchronous motor. Namely, each of a rotor 11 of motor generator 10 (first motor generator: MG1) and a rotor 21 of motor generator 20 (second motor generator: MG2) has a permanent magnet.

When engine 100 is started, motor generator 10 rotates crankshaft 110 of engine 100 by using the electric power of battery 150. Motor generator 10 can also generate electric power by using the motive power of engine 100. The AC power generated by motor generator 10 is converted into DC power by PCU 200 and the DC power is charged into battery 150. The AC power generated by motor generator 10 may also be supplied to motor generator 20.

Rotor 21 of motor generator 20 is mechanically connected to output shaft 60. In the example of FIG. 1, rotor 21 of motor generator 20 is directly coupled to output shaft 60. However, rotor 21 may be mechanically connected to output shaft 60 via a transmission (reduction gear).

Motor generator 20 rotates output shaft 60 by using at least one of the electric power supplied from battery 150 and the electric power generated by motor generator 10. Motor generator 20 can also generate electric power by regenerative braking. The AC power generated by motor generator 20 is converted into DC power by PCU 200 and the DC power is charged into battery 150.

Vehicle 1 is further provided with a braking device 55 serving as a mechanical brake. For example, braking device 55 is configured to, in response to a control command provided from ECU 300, prevent the rotation of drive wheels 50 using the frictional force generated by pressing a brake pad (not shown) against a disc-shaped brake disc 56 by a hydraulic pressure and the like. As described above, in vehicle 1, the braking force corresponding to the user's operation of a brake pedal (not shown) is ensured by a combination of the regenerative braking force by motor generator 20 and the mechanical braking force by braking device 55.

Motor generator 10 is provided with a resolver 421. Resolver 421 detects a rotation angle θ1 of motor generator 10 and outputs a signal indicating the result of detection to ECU 300. Based on a speed of change in the rotation angle detected by resolver 421, a rotation speed (MG1 rotation speed) Nm1 of motor generator 10 can be detected.

Similarly, motor generator 20 is provided with a resolver 422. Resolver 422 detects a rotation angle θ2 of motor generator 20 and outputs a signal indicating the result of detection to ECU 300. Based on a speed of change in rotation angle 82 detected by resolver 422, a rotation speed (MG2 rotation speed) Nm2 of motor generator 20 can be detected.

Planetary gear mechanism 30 includes a sun gear S, a ring gear R, a carrier CA, and a pinion gear P as rotation elements. Sun gear S is coupled to rotor 11 of motor generator 10. Ring gear R is coupled to output shaft 60. Pinion gear P engages with sun gear S and ring gear R. Carrier CA is coupled to crankshaft 110 of engine 100 and holds pinion gear P such that pinion gear P can rotate and revolve. As a result, crankshaft 110 of engine 100, rotor 11 of motor generator 10, and output shaft 60 connected to rotor 21 of motor generator 20 are mechanically coupled by planetary gear mechanism 30. Consequently, vehicle 1 is configured to be capable of transmitting the torque among engine 100, motor generator 10 and output shaft 60 (motor generator 20). Particularly, it is known that when the motive power (or rotation speed) input and output to and from any two of the three shafts, i.e., crankshaft 110, rotor 11 of motor generator 10 and output shaft 60 (rotor 21 of motor generator 20), coupled by planetary gear mechanism 30 is determined, the motive power (or rotation speed) input and output to and from the remaining one shaft is determined based on the motive power input and output to and from the other two shafts.

Battery 150 is shown as a typical example of "power storage device" configured to be rechargeable. Battery 150 is typically formed by a secondary battery such as a nickel-metal hydride secondary battery or a lithium ion secondary battery. A capacitor such as an electric double layer capacitor can also be used as the power storage device. A voltage (hereinafter also referred to as "battery voltage") VB of battery 150 is, for example, a high voltage of approximately 200 V.

SMR 160 is inserted into and connected to a power line between battery 150 and PCU 200. In accordance with a control signal provided from ECU 300, SMR 160 performs switching between a conducting state and an interrupted state between battery 150 and PCU 200.

PCU 200 boosts a voltage of the DC power stored in battery 150, converts the boosted voltage into an AC voltage and supplies the AC voltage to motor generator 10 and motor generator 20. In addition, PCU 200 converts the AC power generated by motor generator 10 and motor generator 20 into DC power and supplies the DC power to battery 150. Namely, battery 150 can receive and transmit (input and output) the electric power between motor generators 10 and 20 through PCU 200. The configuration of PCU 200 will be described in detail with reference to FIG. 2.

Vehicle 1 further includes an accelerator pedal sensor 511, a brake pedal sensor 512, a vehicle speed sensor 513, and a power switch 514. Accelerator pedal sensor 511 detects an amount Acc of the driver's operation of an accelerator pedal (not shown). When the accelerator pedal is not operated, Acc=0. Brake pedal sensor 512 detects an amount Brk of the driver's operation of the brake pedal (not shown). Vehicle speed sensor 513 detects a speed of vehicle 1, i.e., a vehicle speed SP. The values detected by accelerator pedal sensor 511, brake pedal sensor 512 and vehicle speed sensor 513 are input to ECU 300.

Power switch 514 is operated when the driver provides an instruction to start or end driving of the vehicle. When power switch 514 is operated by the user, a signal PWR is input to ECU 300, and thus, in accordance with signal PWR, ECU 300 can detect that power switch 514 has been operated.

For example, when power switch 514 is operated in a driving stop state, with the driver pressing the brake pedal, ECU 300 brings vehicle 1 into "Ready-ON state". In the Ready-ON state, SMR 160 is turned on, battery 150 and PCU 200 are brought into conduction, and vehicle 1 becomes ready to run in response to the operation of the accelerator pedal.

On the other hand, when the driver operates power switch 514 in the Ready-ON state, vehicle 1 shifts to the driving stop state (Ready-OFF state). In the Ready-OFF state, SMR 160 is turned off, electrical interruption is achieved between battery 150 and PCU 200, and vehicle 1 enters a running impossible state.

ECU 300 is configured to include a CPU (Central Processing Unit), a memory, an input and output buffer and the like, all of which are not shown. Based on signals provided from the sensors and the devices as well as a map and a program stored in the memory, ECU 300 controls the devices such that vehicle 1 runs in a desired running state. Various types of control are not limited to processing by software and can also be executed by processing by dedicated hardware (electronic circuit). In the first embodiment, the description assumes that ECU 300 is a single element. ECU 300 corresponds to one example of "control device".

(Configuration of Electric System)

Figure 2:
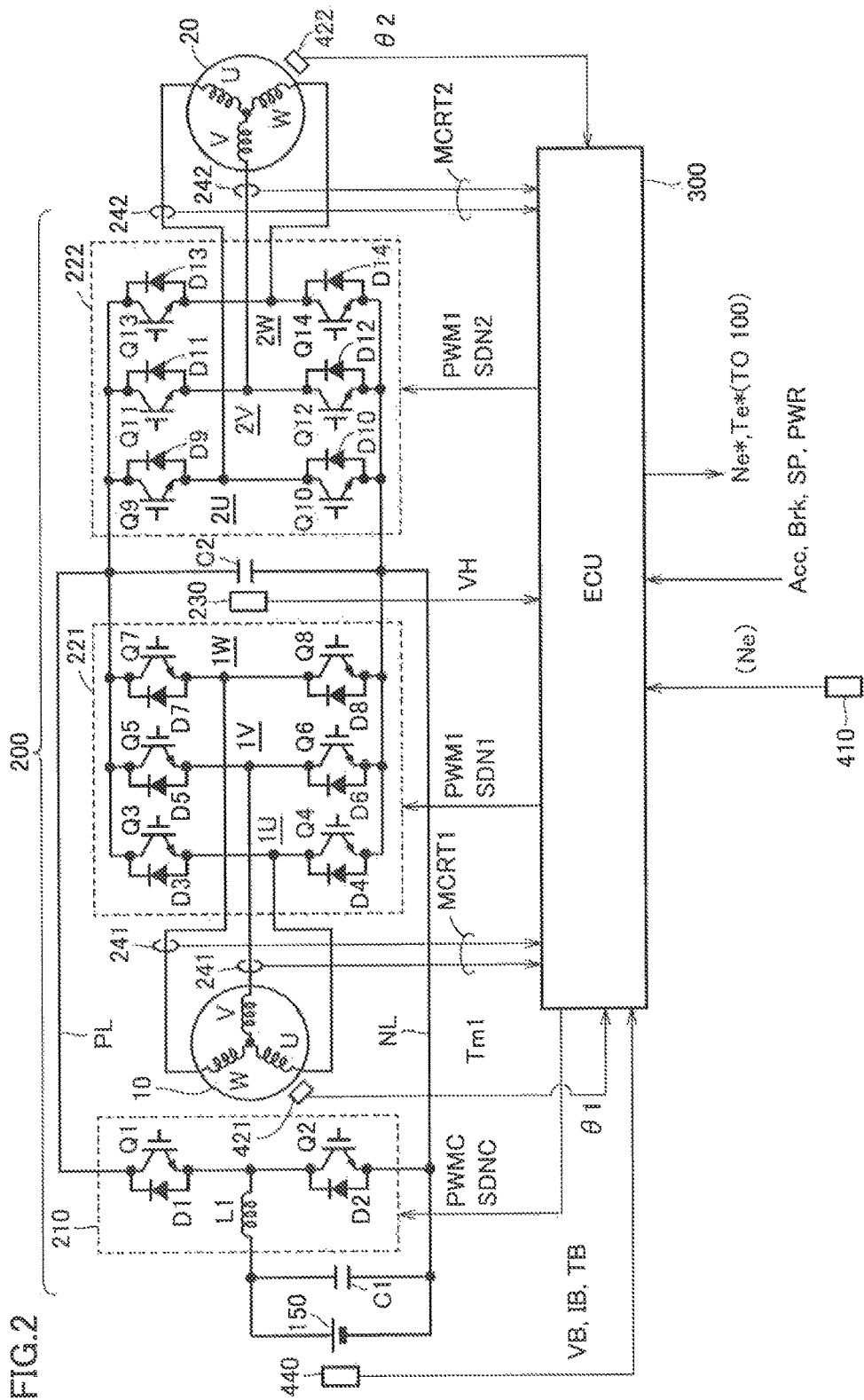
FIG. 2 is a circuit block diagram for describing a configuration of an electric system of the hybrid vehicle according to the present embodiment.

FIG. 2 is a circuit block diagram for describing a configuration of an electric system of vehicle 1.

Referring to FIG. 2, PCU 200 includes a capacitor C1, a converter 210, a capacitor C2, inverters 221 and 222, a voltage sensor 230, and current sensors 241 and 242.

Battery 150 is provided with a monitoring unit 440. Monitoring unit 440 detects battery voltage VB, a current (battery current) IB input and output to and from battery 150, and a temperature (battery temperature) TB of battery 150, and outputs signals indicating these results of detection to ECU 300. Capacitor C1 is connected in parallel to battery 150. Capacitor C1 smoothes battery voltage VB and supplies smoothed battery voltage VB to converter 210.

In accordance with a control signal provided from ECU 300, converter 210 boosts battery voltage VB and supplies the boosted voltage to power lines PL and NL. In addition, in accordance with a control signal provided from ECU 300, converter 210 steps down the DC voltage of power lines PL and NL supplied from one or both of inverter 221 and inverter 222, and charges battery 150.

More specifically, converter 210 is formed by a so-called boosting chopper and includes a reactor L1, switching elements Q1 and Q2, and diodes D1 and D2. Each of switching elements Q1 and Q2 and switching elements Q3 to Q14 described below is, for example, an IGBT (Insulated Gate Bipolar Transistor). Switching elements Q1 and Q2 are connected serially to each other between power line PL and power line NL. Diodes D1 and D2 are connected in anti-parallel between collectors and emitters of switching elements Q1 and Q2, respectively.

Capacitor C2 is connected between power line PL and power line NL. Capacitor C2 smoothes the DC voltage supplied from converter 210 and supplies the smoothed DC voltage to inverters 221 and 222.

Voltage sensor 230 detects a voltage across capacitor C2, i.e., a voltage (hereinafter also referred to as "system voltage") VH between power lines PL and NL connecting converter 210 and inverter 221, and outputs a signal indicating the result of detection to ECU 300.

When system voltage VH is supplied, inverter 221 converts the DC voltage into an AC voltage and drives motor generator 10 in accordance with a control signal provided from ECU 300. As a result, motor generator 10 is controlled by inverter 221 to generate the torque in accordance with a torque command value.

Inverter 221 includes a U-phase arm 1U, a V-phase arm 1V and a W-phase arm 1W. The phase arms are connected in parallel to one another between power line PL and power line NL. U-phase arm 1U has switching elements Q3 and Q4 connected serially to each other. V-phase arm 1V has switching elements Q5 and Q6 connected serially to each other. W-phase arm 1W has switching elements Q7 and Q8 connected serially to each other. Diodes D3 to D8 are connected in antiparallel between collectors and emitters of switching elements Q3 to Q8, respectively.

A midpoint of each phase arm is connected to each phase coil of motor generator 10. Namely, one end of each of a U-phase coil, a V-phase coil and a W-phase coil of motor generator 10 is commonly connected to a neutral point. The other end of the U-phase coil is connected to a midpoint of switching elements Q3 and Q4. The other end of the V-phase coil is connected to a midpoint of switching elements Q5 and Q6. The other end of the W-phase coil is connected to a midpoint of switching elements Q7 and Q8.

Inverter 222 includes phase arms 2U to 2W, switching elements Q9 to Q14, and diodes D9 to D14. Since the configuration of inverter 222 is basically the same as the configuration of inverter 221, description will not be repeated. Motor generator 20 is also controlled by inverter 222 to generate the torque in accordance with a torque command value.

In addition to resolver 421, motor generator 10 is provided with current sensor 241. Similarly, in addition to resolver 422, motor generator 20 is provided with current sensor 242. Current sensor 241 detects a three-phase current (motor current MCRT1) flowing through motor generator 10. Current sensor 242 detects a three-phase current (motor current MCRT2) flowing through motor generator 20. Each of these sensors outputs a signal indicating the result of detection to ECU 300.

ECU 300 controls vehicle 1 as a whole so as to realize running corresponding to the driver's operation. Specifically, based on accelerator pedal operation amount Acc, brake pedal operation amount Brk and vehicle speed SP, ECU 300 calculates the driving force (driving torque) required for running of the vehicle. Furthermore, ECU 300 determines an optimum output distribution among engine 100 and motor generators 10 and 20 for causing this driving torque to act on output shaft 60, and generates operation commands for motor generators 10 and 20 and an operation command for engine 100 in accordance with the determined output distribution. The operation command for engine 100 includes a stop command and an actuation command for engine 100.

When the brake pedal is operated, operation commands for motor generators 10 and 20, engine 100 and braking device 55 are generated such that a distribution between the braking torque generated by braking device 55 and the braking torque generated by regenerative braking by motor generator 20 is cooperatively controlled to cause the braking torque corresponding to brake pedal operation amount Brk to act on output shaft 60. Generally, when the brake pedal is operated, the stop command is provided to engine 100 and the negative torque operation command is provided to motor generator 20.

The operation command for engine 100 (at the time of actuation) includes a target engine rotation speed Ne* and a target engine torque Te*. Target engine rotation speed Ne* and target engine torque Te* are set in a high-efficiency operation region of engine 100 in accordance with the requested power for engine 100 set based on the aforementioned output distribution. ECU 300 controls an actuator (not shown) for adjusting fuel injection, the time of ignition, the valve timing and the like, such that engine 100 is driven in accordance with the operation command (target engine rotation speed Ne* and target engine torque Te*).

The operation commands for motor generators 10 and 20 include a torque command value Tqcom1 of motor generator 10 and a torque command value Tqcom2 of motor generator 20. In accordance with the operation commands, ECU 300 controls converter 210 and inverters 221 and 222, and thereby controls the outputs of motor generators 10 and 20.

ECU 300 sets a target value (hereinafter referred to as "target system voltage") VH* of an output voltage of converter 210, and controls ON and OFF of switching elements Q1 and Q2 of converter 210 such that system voltage VH follows target system voltage VH*. For example, a control signal PWMC for controlling ON and OFF of switching elements Q1 and Q2 is generated by PWM (Pulse Width Modulation) control. Target system voltage VH* is set to be variable depending on the operating state (rotation speed and/or torque) of motor generators 10 and 20.

In addition, based on the outputs and the like of resolvers 421 and 422 and current sensors 241 and 242, ECU 300 controls inverters 221 and 222 such that motor generators 10 and 20 operate in accordance with the operation commands (torque command values Tqcom1 and Tqcom2).

Specifically, in order to control the output of motor generator 10, ECU 300 generates a PWM-type control signal PWM1 for allowing each of switching elements Q3 to Q8 to perform the switching operation and outputs control signal PWM1 to inverter 221, based on system voltage VH, rotation angle θ1 (electric angle), motor current MCRT1, and torque command value Tqcom1. On the other hand, when motor generator 10 is stopped, ECU 300 can generate a gate blocking signal SDN1 for gate blocking of each of switching elements Q3 to Q8, and bring inverter 221 into a shutdown state.

Similarly, in order to control the output of motor generator 20, ECU 300 generates a PWM-type control signal PWM2 for allowing each of switching elements Q9 to Q14 to perform the switching operation and outputs control signal PWM2 to inverter 222, based on system voltage VH, rotation angle θ2 (electric angle), motor current MCRT2, and torque command value Tqcom2. On the other hand, when motor generator 20 is stopped, ECU 300 can generate a gate blocking signal SDN2 for gate blocking of each of switching elements Q9 to Q14, and bring inverter 222 into a shutdown state. As described above, the method for controlling inverter 221 by ECU 300 is the same as the method for controlling inverter 222 by ECU 300.

Based on battery voltage VB, battery current IB and battery temperature TB provided from monitoring unit 440, ECU 300 calculates an SOC (State of Charge) of battery 150, a discharging power upper limit value WOUT (WOUT≥0 and WOUT=0 means prohibition of discharging) and a charging power upper limit value WIN (WIN≤0 and WIN=0 means prohibition of charging). In order to protect battery 150, torque command values Tqcom1 and Tqcom2 described above need to be set such that a sum of the electric power (a product of torque and rotation speed) input and output to and from motor generators 10 and 20 falls within the range of WIN to WOUT.

(Output Control Over Motor Generators in Running Control)

ECU 300 causes vehicle 1 to run while switching the running mode between the above-described EV running and the above-described HV running as needed. For example, the EV running is selected to prevent engine 100 from operating in the low-efficiency region at the time of driving off of the vehicle and at the time of low speed running.

Figure 3:
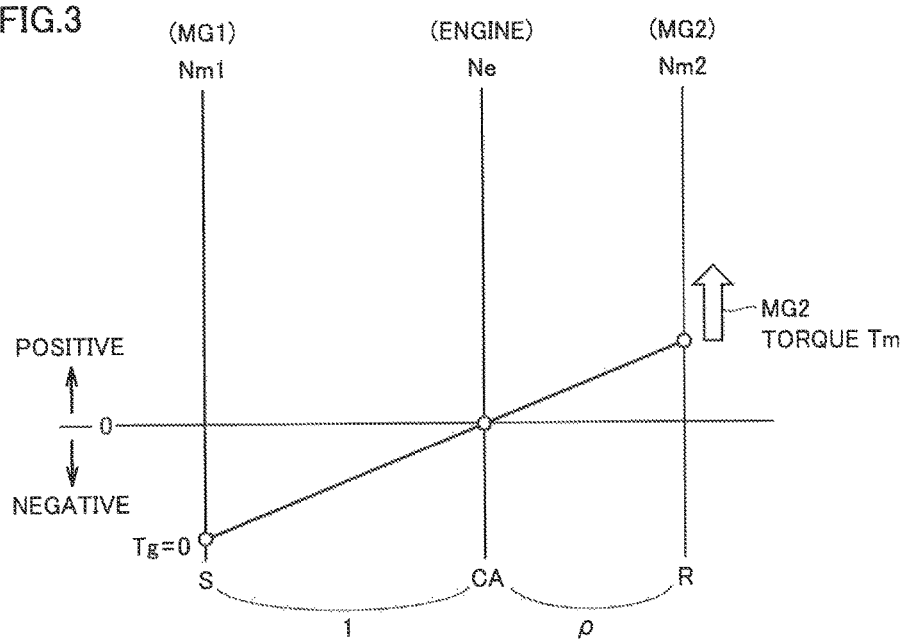
FIG. 3 is a nomographic chart in a planetary gear mechanism during EV running.

FIG. 3 shows a nomographic chart in planetary gear mechanism 30 during the EV running.

Referring to FIG. 3, among MG1 rotation speed Nm1, engine rotation speed Ne and MG2 rotation speed Nm2, which are the rotation speeds of motor generator 10, engine 100 and motor generator 20 mechanically coupled by planetary gear mechanism 30, respectively, the relationship indicated by the following equation (1) is satisfied using a gear ratio $\rho$. Therefore, MG1 rotation speed Nm1, engine rotation speed Ne and MG2 rotation speed Nm2 are connected on the nomographic chart.

$$\rho \cdot Nm1 = Ne \cdot (1+\rho) - Nm2 \cdot Gr \quad (1)$$

In the equation (1), Gr represents a gear ratio between MG2 rotation speed Nm2 and a rotation speed of output shaft 60. In the present embodiment in which a rotor shaft of motor generator 20 is coupled to output shaft 60 without a transmission, the equation (1) is dealt with based on the assumption that Gr=1.

During the EV running, engine 100 is in the stop state and the driving force of vehicle 1 is generated by torque (MG2 torque) Tm of motor generator 20. During the EV running, torque (MG1 torque) Tg of motor generator 10 is zero and motor generator 10 is rotated to follow the rotation of motor generator 20.

The rotation speed of motor generator 10 (MG1 rotation speed Nm1) is obtained by substituting Ne=0 into the above-described equation (1). Namely, Nm1=−(1/$\rho$)·Nm2, and when vehicle 1 moves forward (Nm2>0), motor generator 10 rotates in the negative direction as shown in FIG. 3.

Figure 4:
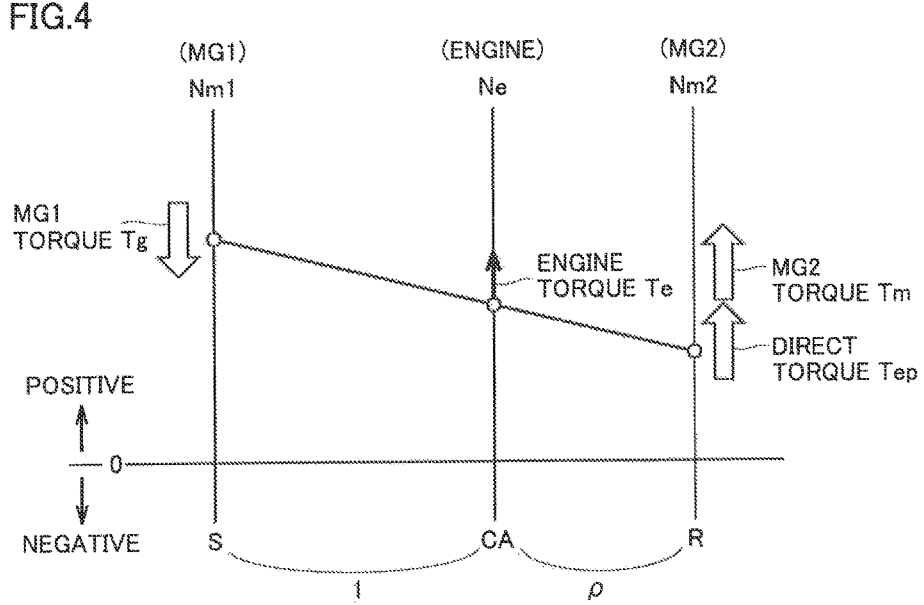
FIG. 4 is a nomographic chart in the planetary gear mechanism during HV running.

On the other hand, when engine 100 needs to be actuated in order to meet an acceleration request by the driver (operation of the accelerator pedal) and in order to charge battery 150, ECU 300 performs switching from the EV running to the HV running. FIG. 4 is a nomographic chart in planetary gear mechanism 30 during the HV running.

Referring to FIG. 4, during the HV running as well, MG1 rotation speed Nm1, engine rotation speed Ne and MG2 rotation speed Nm2 are connected on the nomographic chart in accordance with the relationship indicated by the above-described equation (1). From FIGS. 3 and 4, it is understood that when the rotation speeds of any two of the three shafts, i.e., crankshaft 110 of engine 100 and the rotor shafts of motor generators 10 and 20 coupled to planetary gear mechanism 30, are determined, the rotation speed of the remaining one shaft is determined in accordance with the gear ratio.

During the HV running, engine 100 is actuated, and engine rotation speed Ne and an engine torque Te are controlled in accordance with target engine rotation speed Ne* and target engine torque Te*.

Torque (MG1 torque) Tg and rotation speed Nm1 of motor generator 10 are controlled such that engine 100 operates in accordance with target engine rotation speed Ne* and target engine torque Te*. For example, based on target engine rotation speed Ne* and the present rotation speed of output shaft 60 (MG2 rotation speed Nm2), a target MG1 rotation speed Nm1* can be determined using the following equation (2) obtained by modifying the equation (1):

$$Nm1^* = (Ne^* \cdot (1+\rho) - Nm2)/\rho \quad (2).$$

Furthermore, torque command value Tqcom1 can be set to increase and decrease MG1 torque Tg in accordance with a difference between target MG1 rotation speed Nm1* and MG1 rotation speed Nm1.

During normal forward running, MG1 torque Tg is set to be the negative torque (Tg<0) and motor generator 10 generates electric power as shown in FIG. 4. Therefore, when MG1 torque Tg is controlled in accordance with torque command value Tqcom1, a direct torque Tep (=−Tg/$\rho$) acting in the vehicle forward movement direction is transmitted to output shaft 60. Direct torque Tep corresponds to the torque transmitted to output shaft 60 when engine 100 is operated at target engine rotation speed Ne* and target engine torque Te* while motor generator 10 receives reaction force.

MG2 torque Tm further acts on output shaft 60. Namely, during the HV running, MG2 torque Tm is generated to compensate for an excess or deficiency of direct torque Tep with respect to the driving torque required for vehicle 1, and smooth running control is thereby achieved.

As described above, in vehicle 1, the output torque (Tg and Tm) of motor generators 10 and 20 needs to be controlled to follow torque command values Tqcom1 and Tqcom2 set in accordance with the running control.

(Normal Output Control Over Motor Generators)

Pulse width modulation (PWM) control will be described as output control over the motor generators in the hybrid vehicle according to the present embodiment.

Figure 5:
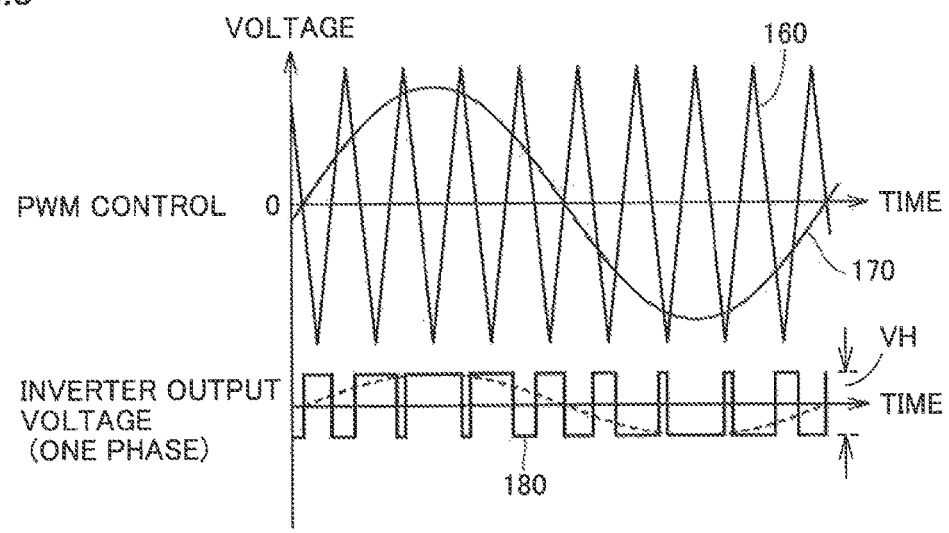
FIG. 5 is a conceptual waveform diagram for describing a basic operation of PWM control.

FIG. 5 is a conceptual waveform diagram for describing a basic operation of the PWM control.

Referring to FIG. 5, in the PWM control, ON and OFF of the switching elements in the respective phases of inverters 221 and 222 are controlled based on voltage comparison between a carrier wave 160 and a phase voltage command 170. As a result, a pulse width modulation voltage 180 serving as a pseudo-sinusoidal voltage is applied to the respective phases of motor generators 10 and 20. Carrier wave 160 can be formed by a triangular wave or a sawtooth wave having a prescribed frequency. Phase voltage command 170 is calculated as described below, as a phase voltage for motor generators 10 and 20 to output the torque in accordance with torque command values Tqcom1 and Tqcom2. The pulse height of pulse width modulation voltage 180 corresponds to system voltage VH.

Figure 6:
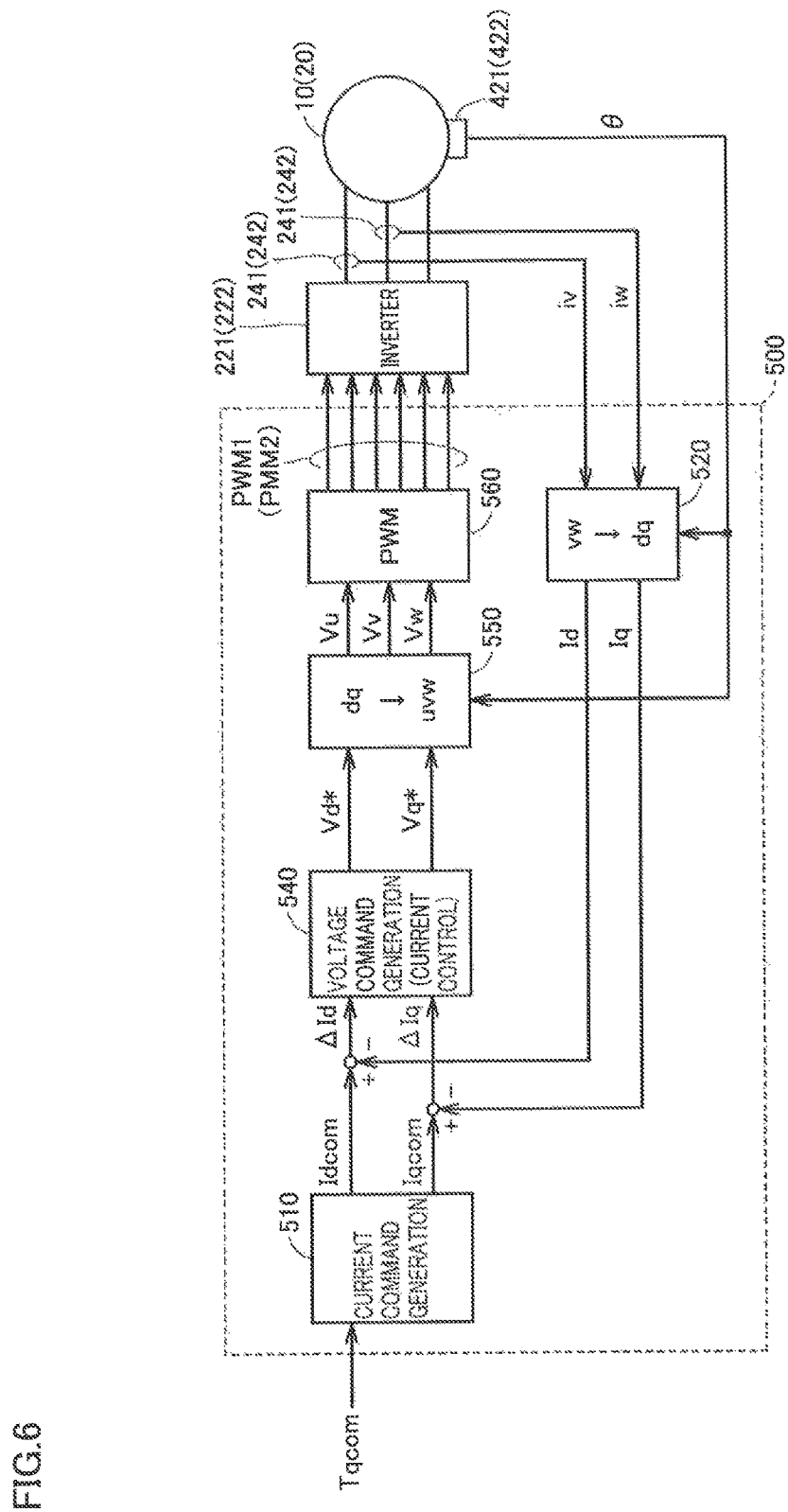
FIG. 6 is a functional block diagram for describing a configuration of output control over each motor generator.

FIG. 6 is a functional block diagram for describing a configuration of the output control over motor generators 10 and 20. The control configuration by the PWM control shown in FIG. 6 is commonly applied to motor generators 10 and 20. In the following description, torque command values Tqcom1 and Tqcom2 of motor generators 10 and 20 will be collectively denoted as "torque command value Tqcom". In addition, rotation angles θ1 and θ2 of motor generators 10 and 20 will be collectively denoted as "electric angle θ".

Referring to FIG. 6, a PWM control unit 500 includes a current command generation unit 510, coordinate conversion units 520 and 550, a voltage command generation unit 540, and a PWM modulation unit 560. Each functional block in the functional block diagrams shown in FIG. 6 and the like may be implemented by an electronic circuit (hardware) having a function corresponding to the block within ECU 300, or may be implemented by ECU 300 performing software processing in accordance with a prestored program. PWM control unit 500 performs control calculations periodically. In the following description, the time that elapses from a previous control period to a present control period of the PWM control is defined as Δt. Namely, Δt corresponds to the control period of the PWM control. This control period Δt may be a constant value, or may be variable depending on a change in MG1 rotation speed Nm1 and MG2 rotation speed Nm2, and the like.

Based on a preliminarily created table and the like, current command generation unit 510 generates a d axis current command value Idcom and a q axis current command value Iqcom in accordance with torque command value Tqcom. A current amplitude is determined by $\sqrt{(Idcom^2+Iqcom^2)}$, and a current phase is determined by a ratio between Idcom and Iqcom.

Coordinate conversion unit 520 calculates a d axis current Id and a q axis current Iq by coordinate conversion (dq conversion) with electric angle θ. Specifically, coordinate conversion unit 520 converts three-phase currents iu, iv and iw detected by current sensor 241 (242) into d axis current Id and q axis current Iq in accordance with the following equation (3):

$$\begin{bmatrix} Id \\ Iq \end{bmatrix} = \sqrt{\frac{2}{3}} \begin{bmatrix} \cos\theta & \cos\left(\theta+\frac{2}{3}\pi\right) & \cos\left(\theta-\frac{2}{3}\pi\right) \\ \sin\theta & \sin\left(\theta+\frac{2}{3}\pi\right) & \sin\left(\theta-\frac{2}{3}\pi\right) \end{bmatrix} \begin{bmatrix} iu \\ iv \\ iw \end{bmatrix}. \quad (3)$$

A sum of instantaneous values of three-phase currents iu, iv and iw is zero (iu+iv+iw=0). Therefore, by arranging current sensors 241 (242) in two phases, the current of the remaining one phase can be obtained by calculation.

A deviation ΔId (ΔId=Idcom−Id) from the d axis current command value and a deviation ΔIq (ΔIq=Iqcom−Iq) from the q axis current command value are input to voltage command generation unit 540. Voltage command generation unit 540 performs PI (proportional integral) calculation of each of d axis current deviation ΔId and q axis current deviation ΔIq with a prescribed gain to obtain a current control deviation, and a d axis voltage command value Vd* and a q axis voltage command value Vq* are generated based on this current control deviation.

It is known that a voltage equation in a d-q axis plane is provided by the following equation (4). Calculation of voltage command values Vd* and Vq* in voltage command generation unit 540 is performed based on a relationship between Id, Iq and Vd, Vq in the voltage equation.

$$\begin{bmatrix} Vd \\ Vq \end{bmatrix} = \begin{bmatrix} Ra+Ld\frac{d}{dt} & -\omega \cdot Lq \\ \omega \cdot Ld & Ra+Lq\frac{d}{dt} \end{bmatrix} \begin{bmatrix} Id \\ Iq \end{bmatrix} + \begin{bmatrix} 0 \\ \omega \cdot \varphi \end{bmatrix} \quad (4)$$

In the equation (4), Vd represents a d axis voltage, Vq represents a q axis voltage, and Ra, Ld and Lq represent circuit constant parameters of motor generator 10 (20). Specifically, Ra represents a resistance value of one phase, Ld represents a d axis inductance, Lq represents a q axis inductance, and 4 represents a magnetic flux produced by the permanent magnet of rotor 11 (21). In addition, a represents a rotation angle speed of motor generator 10 (20).

Coordinate conversion unit 550 calculates voltage commands Vu, Vv and Vw of the U phase, the V phase and the W phase by coordinate conversion (dq inverse conversion) with electric angle θ. Specifically, coordinate conversion unit 550 converts d axis voltage command value Vd* and q axis voltage command value Vq* provided from voltage command generation unit 540 into voltage commands Vu, Vv and Vw in accordance with the following equation (5):

$$\begin{bmatrix} Vu \\ Vv \\ Vw \end{bmatrix} = \sqrt{\frac{2}{3}} \begin{bmatrix} 1 & 0 \\ -\frac{1}{2} & \frac{\sqrt{3}}{2} \\ -\frac{1}{2} & \frac{\sqrt{3}}{2} \end{bmatrix} \begin{bmatrix} \cos\theta & -\sin\theta \\ \sin\theta & \cos\theta \end{bmatrix} \begin{bmatrix} Vd* \\ Vq* \end{bmatrix}. \quad (5)$$

In accordance with voltage comparison between carrier wave 160 (FIG. 5) and voltage commands Vu, Vv and Vw of the respective phases provided from coordinate conversion unit 550, PWM modulation unit 560 generates control signal PWM1 (PWM2) for controlling ON and OFF of inverter 221 (222). Voltage commands Vu, Vv and Vw of the respective phases correspond to phase voltage command 170 in FIG. 5.

As a result, ON and OFF of switching elements Q3 to Q8 (Q9 to Q14) forming the upper and lower arm elements in the respective phases of inverter 221 (222) are controlled in accordance with control signal PWM1 (PWM2). Consequently, the pseudo-sinusoidal voltage (pulse width modulation voltage 180 in FIG. 6) corresponding to voltage commands Vu, Vv and Vw is applied to each phase of motor generator 10 (20).

The amplitude of carrier wave 160 in the PWM modulation corresponds to system voltage VH. However, if the amplitude of voltage commands Vu, Vv and Vw of the respective phases is normalized into an amplitude obtained by dividing the original amplitude value based on Vd* and Vq* by system voltage VH, the amplitude of carrier wave 160 used in PWM modulation unit 560 can be fixed.

(Output Control Over Motor Generator when Resolver is Abnormal)

As described above, electric angle θ is required for the output control over motor generators 10 and 20 each including the rotor provided with the permanent magnet. In the normal time (when the resolver is normal) control shown in FIG. 6, electric angle θ required for coordinate conversion in the equations (3) and (5) by coordinate conversion units 520 and 550 is obtained from a detected value of resolver 421 (422).

Therefore, in the control configuration shown in FIG. 6, when an abnormality occurs in one of resolvers 421 and 422, electric angle θ cannot be detected and thus the output control cannot be executed in one motor generator having the abnormality of the resolver. In the first embodiment, description will be given to control when an abnormality occurs in resolver 422 of motor generator 20 whereas resolver 421 of motor generator 10 can normally detect electric angle θ.

According to Japanese Patent Laying-Open No. 2007-244126, when an abnormality occurs in the resolver as described above, the inverter corresponding to the motor generator (MG2) having the abnormality of the resolver is shut down to stop the torque output from this motor generator, and the limp home running is performed using the output of engine 100 and the motor generator (MG1) not having an abnormality of the resolver.

In the limp home running described in Japanese Patent Laying-Open No. 2007-244126, vehicle 1 runs using only direct torque Tep, based on the assumption that Tm=0 in the nomographic chart shown in FIG. 5. However, during this running of the vehicle, motor generator 10 (MG1) continuously outputs the negative torque, and thus, power generation by motor generator 10 is continuously performed. As a result, when the SOC of battery 150 rises to the upper limit, the torque output by motor generator 10 (MG1) must be stopped, and thus, the running of the vehicle cannot be continued. Namely, the limp home running described in Japanese Patent Laying-Open No. 2007-244126 arouses concern in terms of ensuring of the running distance.

Figure 7:
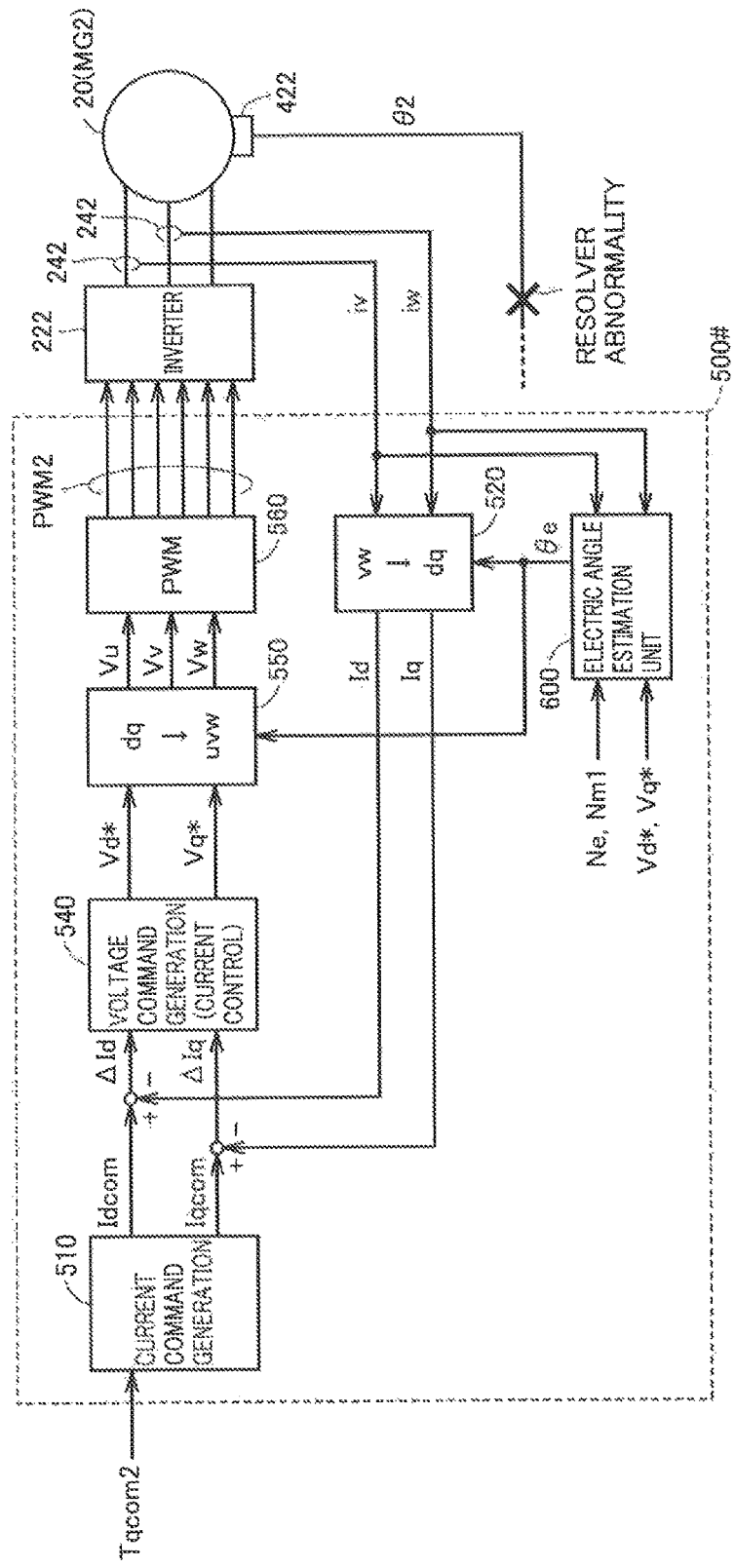
FIG. 7 is a functional block diagram for describing a configuration of output control (resolverless control) over a motor generator having an abnormality of a resolver in the hybrid vehicle according to the present embodiment.

FIG. 7 is a functional block diagram for describing a configuration of output control over the motor generator having an abnormality of the resolver in the hybrid vehicle according to the present embodiment.

In the first embodiment, the output of motor generator 10 in which resolver 421 can normally detect electric angle θ is controlled in accordance with the control configuration shown in FIG. 6. In contrast, the output control shown in FIG. 7 is applied to motor generator 20 having an abnormality of the resolver. Hereinafter, the output control over the motor generator according to FIG. 7 will also be referred to as "resolverless control".

Referring to FIG. 7, as compared with PWM control unit 500 shown in FIG. 6, a PWM control unit 500# for the resolverless control further includes an electric angle estimation unit 600 for estimating an electric angle of the motor generator (here, motor generator 20) having the abnormality of the resolver. Similarly to PWM control unit 500 shown in FIG. 6, PWM control unit 500# performs calculations periodically (control period Δt). In the following description, a control period in PWM control unit 500# shown in FIG. 7 will also be denoted as Δt.

Electric angle estimation unit 600 calculates an estimated electric angle θe of motor generator 20, using engine rotation speed Ne and MG1 rotation speed Nm1, voltage command values Vd* and Vq*, and the current values (three-phase currents) detected by current sensor 242.

By coordinate conversion (equation (3)) with estimated electric angle θe provided from electric angle estimation unit 600, instead of electric angle θ2 detected by resolver 422, coordinate conversion unit 520 calculates d axis current Id and q axis current Iq based on three-phase currents iu, iw and iv detected by current sensor 242.

Similarly, by coordinate conversion (equation (5)) with estimated electric angle θe provided from electric angle estimation unit 600, coordinate conversion unit 550 calculates voltage commands Vu, Vv and Vw based on voltage command values Vd* and Vq* provided from voltage command generation unit 540.

Since the remaining configuration and function of PWM control unit 500# shown in FIG. 7 are the same as those of PWM control unit 500 shown in FIG. 6, detailed description will not be repeated. Namely, in the motor generator having the abnormality of the resolver, dq conversion (coordinate conversion unit 520) and dq inverse conversion (coordinate conversion unit 550) are performed using estimated electric angle θe calculated by electric angle estimation unit 600, without using the detected value of the resolver.

Next, a method for calculating estimated electric angle θe by electric angle estimation unit 600 will be described in detail.

FIG. 8 is a flowchart for describing a control process by electric angle estimation unit 600.

Referring to FIG. 8, in step S100, electric angle estimation unit 600 (ECU 300) calculates an estimated value of MG2 rotation speed Nm2 (estimated MG2 rotation speed Nme2), using engine rotation speed Ne and MG1 rotation speed Nm1 obtained from the detected values of rotation detection sensor 410 and resolver 421.

In accordance with the nomographic chart shown in FIG. 4 and the equation (1), an equation for calculating estimated MG2 rotation speed Nme2 in step S100 can be the following equation (6) obtained by modifying the equation (1) premised on Gr=1:

$$Nme2 = Ne \cdot (1+\rho) - Nm1 \cdot \rho \qquad (6).$$

In step S110, electric angle estimation unit 600 (ECU 300) converts estimated MG2 rotation speed Nme2 obtained in step S100 into a rotation angle speed ω. Based on a product of rotation angle speed ω and control period Δt of the PWM control, an electric angle change amount (ω·Δt) between a previous control period and a present control period can be obtained.

Electric angle estimation unit 600 can calculate estimated electric angle θe in each control period by sequentially integrating the electric angle change amount (ω*Δt) between the previous control period and the present control period based on estimated MG2 rotation speed Nme2. For example, in an i-th (i: natural number) control period, an estimated electric angle θe(i) in the present control period can be calculated based on a sum of an estimated electric angle θe(i−1) in a previous control period and an electric angle change amount ω·Δt between the (i−1)-th period and the i-th period.

On the other hand, when an initial value of estimated electric angle θe at the start of the resolverless control has an error, mere integration of the electric angle change amount (ω·Δt) between the previous control period and the present control period results in an error in the output torque of the motor generator. Therefore, in the resolverless control according to the present embodiment, a process of calculating an electric angle estimation error Δθ is performed in each control period in order to increase the accuracy of estimated electric angle θe.

Specifically, in step S120, electric angle estimation unit 600 (ECU 300) calculates estimation error Δθ of estimated electric angle θ(i−1) in the previous control period, using the control command for inverter 222 by the PWM control and the actual current value based on the detected value of current sensor 242.

FIG. 9 is a conceptual diagram for describing a principle of calculation of electric angle estimation error ΔG in step S120.

Referring to FIG. 9, a current vector on the d-q axis plane corresponds to a vector sum of d axis current Id and q axis current Iq obtained by converting three-phase currents iu, iv and iw in accordance with the above-described equation (3). Electric angle θ at this time is defined by an angle formed between the d axis corresponding to the north pole of the permanent magnet and an AC winding of the U phase.

A d' axis and a q' axis in FIG. 9 refer to the d axis and the q axis based on which present estimated electric angle θe is calculated. The d' axis and the q' axis have an error of Δθ with respect to the actual d axis and the actual q axis. In step S120 in FIG. 8, calculation and estimation of this electric angle estimation error Δθ is performed.

Referring again to FIG. 7, conversion from voltage command values Vd* and Vq* to three-phase voltage commands Vu, Vv and Vw based on current feedback is performed using estimated electric angle θe including electric angle estimation error Δθ. Furthermore, the current produced by application of voltage commands Vu, Vv and Vw based on voltage command values Vd* and Vq*, i.e., the current actually produced in accordance with the control command for inverter 222, has a value corresponding to the actual electric angle (θe−Δθ). Namely, the d axis current and the q axis current obtained by converting the actual three-phase current values include electric angle estimation error $\Delta\theta$ as well.

Therefore, the relationship of the following equation (7) corresponding to linear transformation of angle $\Delta\theta$ due to rotation is satisfied between d axis and q axis currents Id and Iq to be generated based on voltage command values Vd* and Vq* in accordance with the voltage equation (equation (4)) and actually generated d axis and q axis currents Id_s and Iq_s:

$$\begin{bmatrix} Id \\ Iq \end{bmatrix} = \begin{bmatrix} \cos\Delta\theta & -\sin\Delta\theta \\ \sin\Delta\theta & \cos\Delta\theta \end{bmatrix} \begin{bmatrix} Id\_s \\ Iq\_s \end{bmatrix}. \quad (7)$$

Similarly, the relationship of the following equation (8) is satisfied between theoretical values Vd_t and Vq_t corresponding to voltage command values Vd* and Vq* and d axis and q axis voltages Vd and Vq actually acting on motor generator 20:

$$\begin{bmatrix} Vd \\ Vq \end{bmatrix} = \begin{bmatrix} \cos\Delta\theta & -\sin\Delta\theta \\ \sin\Delta\theta & \cos\Delta\theta \end{bmatrix} \begin{bmatrix} Vd\_t \\ Vq\_t \end{bmatrix}. \quad (8)$$

Figure 10:
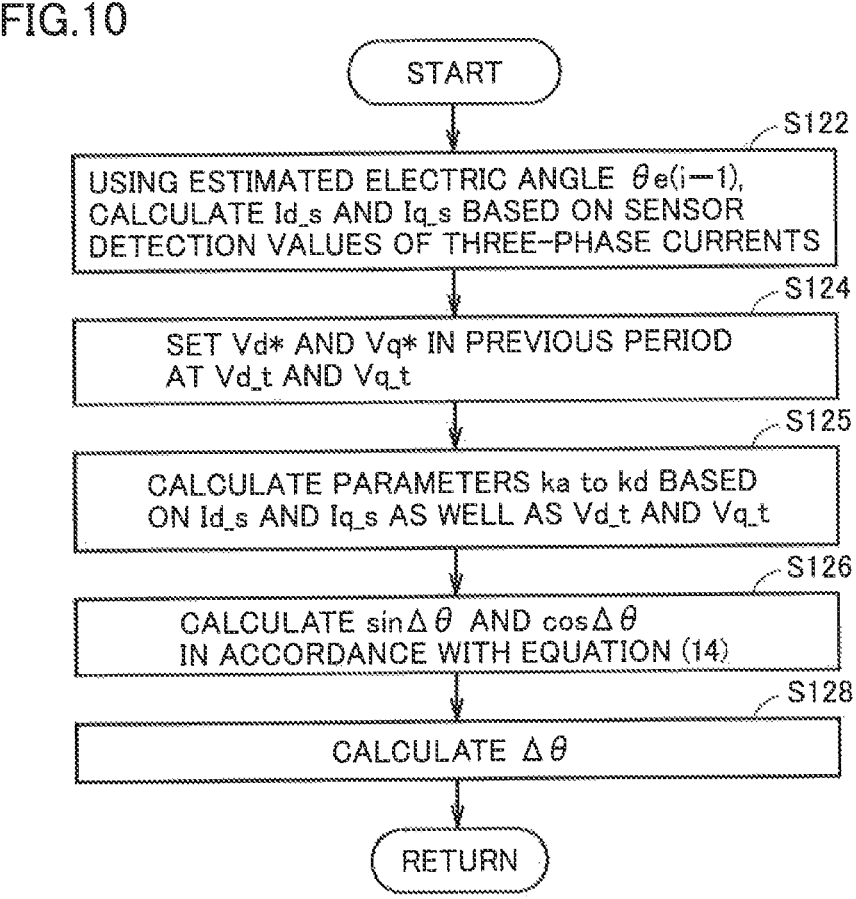
FIG. 10 is a flowchart for describing in detail a process of estimating the electric angle estimation error in FIG. 8.

FIG. 10 is a flowchart for describing in detail a process of estimating electric angle estimation error $\Delta\theta$ in step S120 in FIG. 8.

Referring to FIG. 10, step S120 shown in FIG. 8 has steps S122 to S128.

In step S122, by coordinate conversion (equation (3)) with estimated electric angle θe(i−1) in the previous period, electric angle estimation unit 600 (ECU 300) calculates d axis current Id_s and q axis current Iq_s based on the sensor detected values, from the three-phase currents (iu, iv and iw) in the present control period detected by current sensor 242.

In step S124, electric angle estimation unit 600 (ECU 300) sets voltage command values Vd* and Vq* in the previous period, i.e., the (i−1)-th period at theoretical values Vd_t and Vq_t of the voltage command values. Furthermore, in step S125, electric angle estimation unit 600 calculates coefficient parameters ka to kd for obtaining electric angle estimation error $\Delta\theta$, based on Id_s and Iq_s based on the sensor detected values and theoretical values Vd_t and Vq_t of the voltage command values.

Now, coefficient parameters ka to kd will be described.

In the left-hand side of the voltage equation (equation (4)), Vd=cos $\Delta\theta$*Vd_t−sin $\Delta\theta$=·*Vq_t and Vq=sin $\Delta\theta$·Vd_t+cos $\Delta\theta$·Vq_t obtained from the equation (8) can be substituted into d axis voltage Vd and q axis voltage Vq.

Similarly, in the right-hand side of the voltage equation (equation (4)), Id=cos $\Delta\theta$·Id_s−sin $\Delta\theta$·Iq_s and Iq=sin $\Delta\theta$·Id_s+cos $\Delta\theta$·Iq_s obtained from the equation (7) can be substituted into d axis current Id and q axis current Iq.

As a result of substitution described above, the voltage equation can be rewritten into the following equation (9) in which cos $\Delta\theta$ and sin $\Delta\theta$ are variables:

$$\begin{bmatrix} ka & kb \\ kd & kc \end{bmatrix} \begin{bmatrix} \cos\Delta\theta \\ \sin\Delta\theta \end{bmatrix} = \begin{bmatrix} 0 \\ \omega\cdot\varphi \end{bmatrix}. \quad (9)$$

In the equation (9), ka to kd serving as the coefficients of cos $\Delta\theta$ and sin $\Delta\theta$ are indicated by the following equations (10) to (13) in which Id_s and Iq_s based on the sensor detected values and theoretical values Vd_t and Vq_t of the voltage command values are variables:

$$ka = \text{Vd\_t} - Ra\cdot\text{Id\_s} - Ld\frac{d}{dt}\text{Id\_s} + \omega\cdot Lq\cdot\text{Iq\_s} \quad (10)$$

$$kb = -\text{Vq\_t} + Ra\cdot\text{Iq\_s} + Ld\cdot\frac{d}{dt}\text{Iq\_s} + \omega\cdot Lq\cdot\text{Id\_s} \quad (11)$$

$$kc = \text{Vd\_t} - Ra\cdot\text{Id\_s} - Lq\frac{d}{dt}\text{Id\_s} + \omega\cdot Ld\cdot\text{Iq\_s} \quad (12)$$

$$kd = \text{Vq\_t} - Ra\cdot\text{Iq\_s} - Lq\frac{d}{dt}\text{Iq\_s} - \omega\cdot Ld\cdot\text{Id\_s}. \quad (13)$$

It is understood that when $\Delta\theta=0$, i.e., Id=Id_s and Iq=Iq_s as well as Vd=Vd_t and Vq=Vq_t in the equation (9), ka=0 and kd=ω·φ (ka and kd serve as the coefficients of cos $\Delta\theta$) based on comparison with the voltage equation (equation (4)). In addition, when θ=0, sin $\Delta\theta$=0, and thus, kb·sin $\Delta\theta$=kc·sin $\Delta\theta$=0.

In step S125, electric angle estimation unit 600 (ECU 300) substitutes Id_s and Iq_s as well as Vd_t and Vq_t obtained in steps S122 and S124 into the equations (10) to (13), and thereby calculates coefficient parameters ka to kd. Circuit constant parameters Ra, Ld and Lq in the voltage equation are obtained preliminarily, and rotation angle speed ω is obtained in step S110 (FIG. 8).

Furthermore, in step S126, electric angle estimation unit 600 (ECU 300) substitutes coefficient parameters ka to kd obtained in step S125 into the following equation (14) obtained by modifying a simultaneous equation of the equation (9), and thereby calculates sin $\Delta\theta$ and cos $\Delta\theta$:

$$\begin{bmatrix} \cos\Delta\theta \\ \sin\Delta\theta \end{bmatrix} = \frac{1}{ka\cdot kc - kb\cdot kd} \begin{bmatrix} kc & -kb \\ -kd & ka \end{bmatrix} \begin{bmatrix} 0 \\ \omega\cdot\varphi \end{bmatrix}. \quad (14)$$

Then, in step S128, electric angle estimation unit 600 (ECU 300) calculates electric angle estimation error $\Delta\theta$ based on sin $\Delta\theta$ and/or cos $\Delta\theta$ calculated in step S126.

Referring again to FIG. 8, the process proceeds to step S130 and electric angle estimation unit 600 (ECU 300) calculates estimated electric angle θe(i) in the present control period (i.e., the i-th control period). Specifically, the electric angle change amount (ω*Δt) between the previous control period and the present control period based on rotation angle speed ω obtained in step S110 is added to estimated electric angle θe(i−1) in the previous control period, and further, correction is made with electric angle estimation error $\Delta\theta$ calculated in step S130, to thereby calculate estimated electric angle θe(i) (θe(i)=θe(i−1)+ω·Δt−$\Delta\theta$).

The correction with electric angle estimation error $\Delta\theta$ may be made by directly reflecting electric angle estimation error $\Delta\theta$ in estimated electric angle θe for each control period as described above, or may be made by reflecting electric angle estimation error $\Delta\theta$ in estimated electric angle θe as a learned value smoothed by a low pass filter and the like. In either case, $\Delta\theta$ converges to zero as the error between estimated electric angle θe and the actual electric angle becomes smaller.

Furthermore, in step S140, ECU 300 executes torque control over motor generator 20 having the abnormality of the resolver, by using estimated electric angle θe obtained by the processing in steps S100 to S130, i.e., obtained by electric angle estimation unit 600. Specifically, control signal PWM2 of inverter 222 is generated by control calculation in which estimated electric angle θe is used for dq conversion and dq inverse conversion in accordance with the equations (3) and (5) in coordinate conversion units 520 and 550 in FIG. 7.

As a result, by the resolverless control according to the functional block diagram shown in FIG. 7, the output of motor generator 20 can be controlled by inverter 222. Therefore, even when a failure occurs in the resolver of motor generator 20 and the detected value of the electric angle cannot be obtained, the output of motor generator 20 can be controlled in accordance with torque command value Tqcom2. In the control configuration shown in FIG. 7, the output of motor generator 20 can be controlled even when torque command value Tqcom2 is set at the zero torque or the negative torque. Therefore, even when an abnormality occurs in resolver 422, the torque for regenerative braking by motor generator 20 can be output by applying the resolverless control.

As described above, according to the hybrid vehicle of the present embodiment, by applying the resolverless control to the motor generator having the abnormality of the resolver, the torque can be output from this motor generator during running of the vehicle, even when the resolver is abnormal. During running of the vehicle in accordance with the resolverless control, an upper limit value of the vehicle driving force (driving torque of the output shaft) is preferably limited, as compared with the normal running (when the abnormality of the resolver does not occur).

Therefore, when an abnormality occurs in the resolver of motor generator 20, in addition to direct torque Tep by motor generator 10 and engine 100, MG2 torque Tm can be continuously output during running of the vehicle by the resolverless control including estimation of the electric angle. An upper limit value of MG2 torque Tm during running of the vehicle at the time of resolver abnormality is preferably limited as compared with the normal running (when the resolver is normal). However, even under this limitation, vehicle 1 can run with power consumption by motor generator 20. In addition, regenerative braking by motor generator 20 can be used, and thus, an overload of braking device 55 can also be prevented.

As a result, the running distance for running of the vehicle when an abnormality occurs in the resolver of motor generator 20 can be increased, as compared with the case of running with the torque output from motor generator 20 being stopped (i.e., no power consumption and no power regeneration) as described in Japanese Patent Laying-Open No. 2007-244126.

Modification of First Embodiment

In the resolverless control described in the first embodiment, correction with electric angle estimation error Δθ is made for each control period, and thereby, Δθ finally converges to zero and the output of the motor generator can be controlled in this state. On the other hand, when the initial value of estimated electric angle θe at the start of the resolverless control has an error, there is a possibility that the torque of the motor generator cannot be accurately controlled before electric angle estimation error Δθ converges to zero.

Therefore, in a modification of the first embodiment, a process of controlling running of the vehicle to suppress the torque error by the resolverless control will be described. In the modification of the first embodiment as well, description will be given to the case in which an abnormality occurs in resolver 422 of motor generator 20 whereas resolver 421 of motor generator 10 can normally detect electric angle θ.

Figure 11:
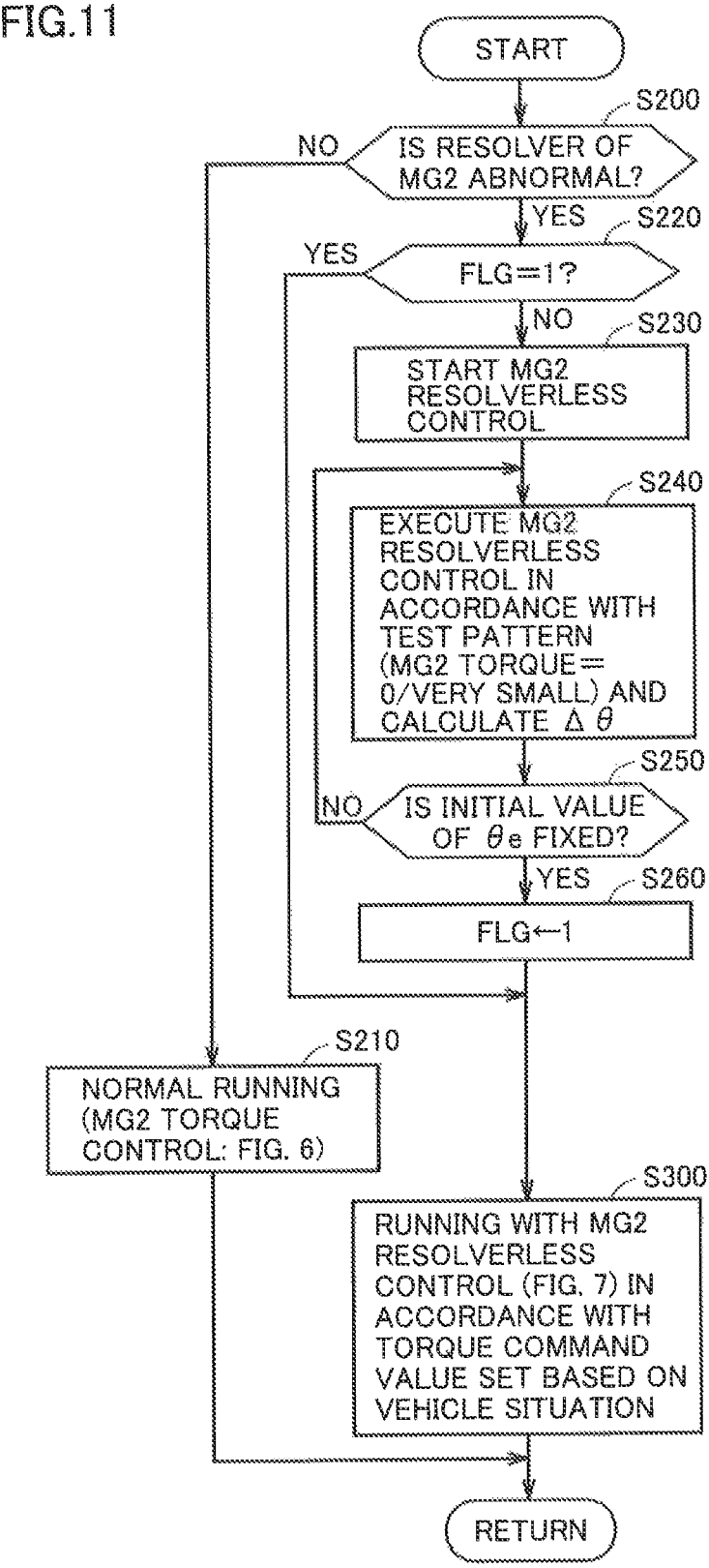
FIG. 11 is a flowchart for describing a process of controlling running of the vehicle at the time of resolver abnormality according to a modification of the first embodiment.

FIG. 11 is a flowchart for describing a process of controlling running of the vehicle at the time of resolver abnormality according to the modification of the first embodiment. The control process in the flowchart shown in FIG. 11 is repeatedly performed by ECU 300 in the Ready-ON state.

Referring to FIG. 11, in step S200, ECU 300 determines whether or not an abnormality (MG2 resolver abnormality) is occurring in the resolver of motor generator 20. The determination in step S200 can be made based on, for example, output of a diagnosis code and the like.

If the MG2 resolver abnormality is not occurring (NO in S200), ECU 300 performs the normal running in step S210. During the normal running, the output of motor generator 20 is controlled using electric angle θ based on the detected value of resolver 422 in accordance with the control configuration shown in FIG. 6.

On the other hand, if the MG2 resolver abnormality is occurring (YES in S200), ECU 300 performs running of the vehicle in accordance with the following control process. First, in step S220, ECU 300 determines whether or not an initial value flag FLG=1. Initial value flag FLG has a default value of "0" at the time of transition to the Ready-ON state. When electric angle estimation error Δθ converges to zero and the initial value of estimated electric angle θe is fixed, initial value flag FLG is changed from "0" to "1".

If FLG=0, i.e., the initial value of θe is not fixed (NO in S220), ECU 300 starts the output control (resolverless control) over the motor generator having the abnormality of the resolver in step S230. Namely, even when the abnormality occurs in the resolver of motor generator 20, inverter 222 is actuated and switching control by switching elements Q9 to Q14 (FIG. 2) becomes ready to be started. As a result, the output torque of motor generator 20 is controlled in accordance with the configuration shown in FIG. 7.

In step S240, ECU 300 executes the resolverless control over motor generator 20 in accordance with a test pattern. For example, in the test pattern, torque command value Tqcom2 of motor generator 20 is set at zero or a very small value. Torque command value Tqcom2 in the test pattern may be constant or varied. In accordance with the setting of torque command value Tqcom2, an upper limit value of a range of the output torque of motor generator 20 in the test pattern is determined (when Tqcom2 is constant, this constant value corresponds to the upper limit value). In this state, the PWM control with estimated electric angle θe calculated by electric angle estimation unit 600 is executed in accordance with the resolverless control shown in FIG. 7. Namely, during the PWM control in accordance with the test pattern, electric angle estimation error Δθ is updated for each period in accordance with the flowchart shown in FIG. 10.

During execution of the resolverless control in accordance with the test pattern (S240), ECU 300 determines in step S250 whether or not electric angle estimation error Δθ has converged to zero and the initial value of estimated electric angle θe has been fixed. For example, when a state of an absolute value of electric angle estimation error Δθ being smaller than a prescribed value s ($|\Delta\theta|<\varepsilon$) continues for a certain time period, the determination of YES can be made in step S250. Alternatively, when the resolverless control in accordance with the test pattern continues for a prescribed time period, the determination of YES may be made in step S250. Before the determination of YES is made in step S250 and the initial value of estimated electric angle θe is fixed (NO in S250), the resolverless control in accordance with the test pattern in step S240 is repeatedly executed.

If the initial value of estimated electric angle θe is fixed (YES in S250), the process proceeds to step S260 and ECU 300 sets initial value flag FLG at "1". As a result, in the subsequent process, the processing in steps S240 to S260 is skipped when the determination of YES is made in step S220.

After the initial value of estimated electric angle θe is fixed, in step S300, ECU 300 performs running of the vehicle with the torque output from motor generator 20, using the resolverless control (FIG. 7) in accordance with torque command value Tqcom2 set based on the vehicle situation. Namely, unlike step S240, during the resolverless control in step S300, the output of motor generator 20 is controlled in accordance with torque command value Tqcom2 set based on the vehicle situation (e.g., accelerator pedal operation amount Acc and vehicle speed SP), and thereby vehicle 1 runs. As described above, during running of the vehicle in accordance with the resolverless control (S300), the upper limit value of the vehicle driving force (driving torque Tp of the output shaft) is preferably limited, as compared with the normal running in step S210.

Torque command value Tqcom2 is preferably limited such that an upper limit value of the range of the output torque of motor generator 20 during the resolverless control in step S300 is smaller than the upper limit value during the normal running (when the resolver is normal) in step S210. Similarly, torque command value Tqcom2 is set such that the upper limit value of the range of the output torque of motor generator 20 during the resolverless control in accordance with the test pattern (S240) is also smaller than the upper limit value during the resolverless control in step S300. Conversely, during the resolverless control in step S300, torque command value Tqcom2 can be set in a higher torque region, as compared with the output torque during the resolverless control in accordance with the test pattern (S240).

As described above, according to the hybrid vehicle of the modification of the first embodiment, the torque error of motor generator 20 at the start of the resolverless control can be suppressed and running of the vehicle at the time of resolver abnormality can be performed. Therefore, the occurrence of an error in the vehicle driving force due to the torque error can be avoided and running of the vehicle at the time of resolver abnormality can be smoothly performed.

Second Embodiment

In a second embodiment, description will be given to the resolverless control when ECU 300 shown in FIG. 1 is arranged in a divided manner for each of a running control function, a motor generator control function and an engine control function. Similarly to the first embodiment, in the second embodiment as well, description will be given to control when an abnormality occurs in resolver 422 of motor generator 20 whereas resolver 421 of motor generator 10 can normally detect electric angle θ.

Figure 12:
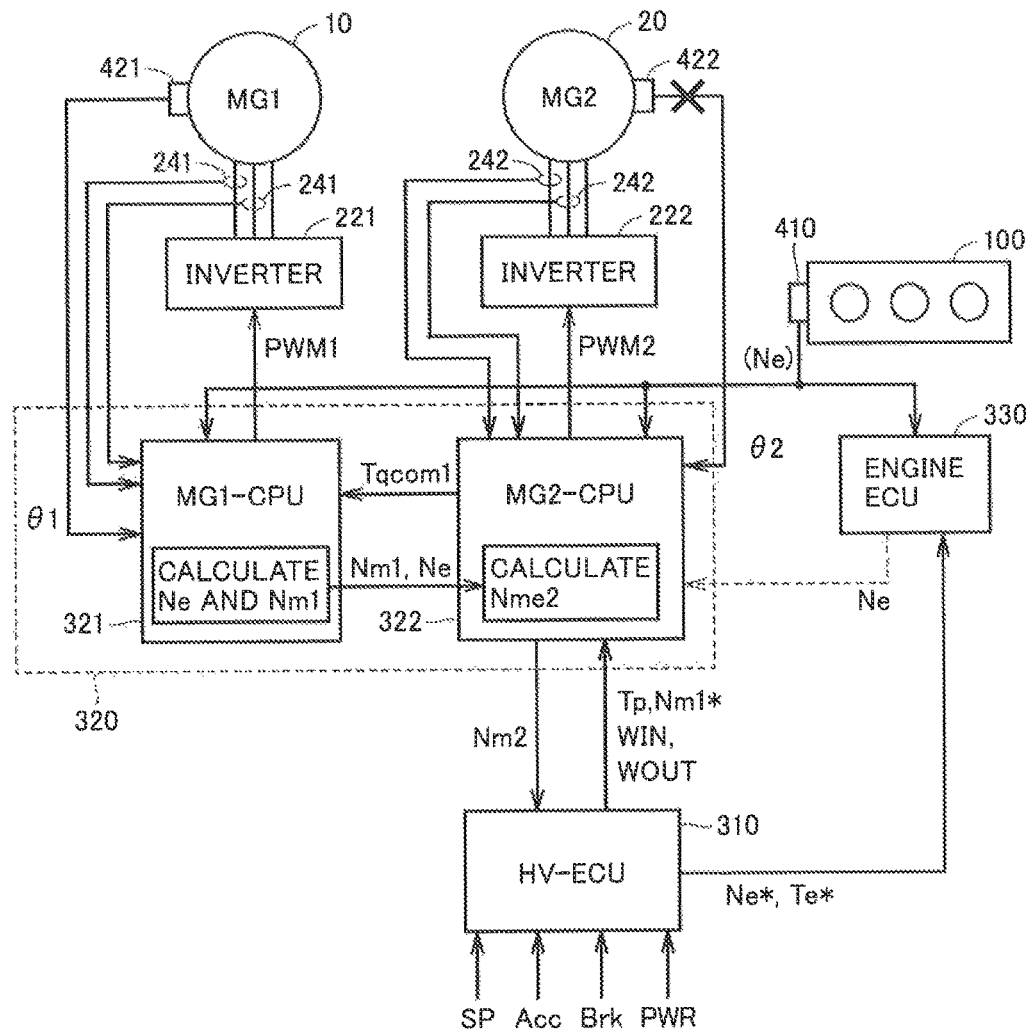
FIG. 12 is a functional block diagram for describing a distributed arrangement configuration of ECUs in a hybrid vehicle according to a second embodiment.

FIG. 12 is a functional block diagram for describing a distributed arrangement configuration of ECUs in a hybrid vehicle according to the second embodiment.

Referring to FIG. 12, in the hybrid vehicle according to the second embodiment, ECU 300 is divided into an HV-ECU 310 for executing integrated control and running control over vehicle 1, an MG-ECU 320 for controlling motor generators 10 and 20, and an engine ECU 330 for controlling engine 100. Furthermore, MG-ECU 320 has an MG1-CPU (Central Processing Unit) 321 for controlling motor generator 10, and an MG2-CPU 322 for controlling the output of motor generator 20. Namely, in the configuration shown in FIG. 12, HV-ECU 310, MG1-CPU 321, MG2-CPU 322, and engine ECU 330 correspond to "a plurality of processing units".

HV-ECU 310 calculates driving torque Tp required for running of the vehicle, based on the vehicle situation (vehicle speed SP, accelerator pedal operation amount Acc and brake pedal operation amount Brk). Furthermore, the requested power for vehicle 1 as a whole (total requested power Ptl) is calculated based on a sum of the driving power required to cause driving torque Tp to act on output shaft 60 (FIG. 1) and the power (charging and discharging request power) required to control the SOC of battery 150.

Furthermore, HV-ECU 310 makes a selection between the HV running and the EV running based on total requested power Ptl. For example, when total requested power Ptl is equal to or greater than a prescribed threshold value, the HV running is selected and an instruction to actuate engine 100 is provided. On the other hand, when total requested power Ptl is smaller than the threshold value, the EV running is selected and an instruction to stop engine 100 is provided.

At the time of the HV running, HV-ECU 310 sets the operation command for engine 100 (target engine rotation speed Ne* and target engine torque Te*) in accordance with total requested power Ptl. Based on the operation command provided from HV-ECU 310, engine ECU 330 controls a group of actuators of engine 100. Engine rotation speed Ne detected by rotation detection sensor 410 is used for the control over engine 100 by engine ECU 330.

Furthermore, at the time of the HV running, HV-ECU 310 sets the target rotation speed of motor generator 10 (target MG1 rotation speed Nm1*) in accordance with the nomographic chart shown in FIG. 4, based on the operation command for engine 100 (target engine rotation speed Ne* and target engine torque Te*).

MG2-CPU 322 receives, from HV-ECU 310, driving torque Tp, target MG1 rotation speed Nm1*, and discharging power upper limit value WOUT and charging power upper limit value WIN of battery 150.

MG2-CPU 322 calculates torque command value Tqcom1 of motor generator 10 in accordance with driving torque Tp and target rotation speed Nm1* transmitted from HV-ECU 310. Furthermore, torque command value Tqcom2 of motor generator 20 is set in accordance with an excess or deficiency of direct torque Tep and driving torque Tp based on torque command value Tqcom1. As described above, during running of the vehicle at the time of resolver abnormality (S300 in FIG. 11), the upper limit value of torque command value Tqcom2 is preferably limited to be on the lower torque side, as compared with the normal running (S210 in FIG. 11). Therefore, the vehicle driving force (driving torque Tp of the output shaft) is limited in HV-ECU 310, as compared with the normal running (when the resolver is normal).

As described above, in the distributed arrangement configuration of the ECUs shown in FIG. 12, torque command values Tqcom1 and Tqcom2 are set in MG-ECU 320 (here, MG2-CPU 322), not in HV-ECU 310. When the rotation speeds of motor generators 10 and 20 change suddenly due to the occurrence of a skid or grip of vehicle 1, MG-ECU 320 can grasp the change in MG1 rotation speed Nm1 and MG2 rotation speed Nm2 more quickly than HV-ECU 310, based on the detected values of resolvers 421 and 422.

Therefore, in the distributed arrangement configuration shown in FIG. 12, torque command values Tqcom1 and Tqcom2 can be appropriately set such that a sum of the electric power input and output to and from motor generators 10 and 20 does not exceed the range of WIN to WOUT of battery 150 in accordance with the sudden change in MG1 rotation speed Nm1 and MG2 rotation speed Nm2.

Torque command value Tqcom1 is transmitted from MG2-CPU 322 to MG1-CPU 321. The detected value of current sensor 241 and the detected value of resolver 421 are input to MG1-CPU 321.

MG1-CPU 321 generates control signal PWM1 of inverter 221 such that the output torque of motor generator 10 is controlled in accordance with torque command value Tqcom1. Using electric angle θ1 based on the detected value of resolver 421, control signal PWM1 is generated in accordance with the control configuration of current feedback detected by current sensor 241, which is shown in FIG. 6.

The detected value of current sensor 242 and the detected value of resolver 422 are further input to MG2-CPU 322. MG2-CPU 322 generates control signal PWM2 of inverter 222 such that the output torque of motor generator 20 is controlled in accordance with calculated torque command value Tqcom2. When resolver 422 is normal, control signal PWM2 is executed using electric angle θ2 based on the detected value of resolver 422, in accordance with the control configuration shown in FIG. 6.

On the other hand, when resolver 422 is abnormal, the output of motor generator 20 is controlled by the resolverless control shown in FIG. 7, without using the detected value of resolver 422. During the resolverless control, the electric angle of the motor generator (motor generator 20) having the abnormality of the resolver is estimated. At this time, MG2 rotation speed Nm2 needs to be calculated and estimated from engine rotation speed Ne and MG1 rotation speed Nm1 by using the equation (6) according to the nomographic chart shown in FIG. 4, as described in the first embodiment.

In order to accurately estimate MG2 rotation speed Nm2, it is important that engine rotation speed Ne and MG1 rotation speed Nm1 should have values of the same timing. Conversely, when the timing of engine rotation speed Ne obtained from the detected value of rotation detection sensor 410 is different from the timing of MG1 rotation speed Nm1 obtained from the detected value of resolver 421 in the calculation in step S100 in FIG. 8, an error occurs in estimated MG2 rotation speed Nme2. As a result, an error between estimated electric angle θe and actual electric angle θ may become larger, and thus, an error of the output torque of motor generator 20 may become larger.

Therefore, in the distributed arrangement configuration of the ECUs in the hybrid vehicle according to the second embodiment, the detected value of rotation detection sensor 410 is input to MG1-CPU 321 that is not directly involved in controlling engine 100. Using the detected values of resolver 421 and rotation detection sensor 410, MG1-CPU 321 calculates engine rotation speed Ne and MG1 rotation speed Nm1 required for estimation of the MG2 rotation speed.

Engine rotation speed Ne and MG1 rotation speed Nm1 calculated by MG1-CPU 321 are transmitted to MG2-CPU 322. Using engine rotation speed Ne and MG1 rotation speed Nm1 provided from MG1-CPU 321, MG2-CPU 322 calculates estimated MG2 rotation speed Nme2 in accordance with the equation (6). Namely, MG1-CPU 321 corresponds to "first processing unit".

Furthermore, using calculated estimated MG2 rotation speed Nme2, MG2-CPU 322 executes the resolverless control described in the first embodiment and thereby generates control signal PWM2 of inverter 222. As a result, the output of motor generator 20 can be controlled in accordance with torque command value Tqcom2.

Now, as a comparative example, consideration is given to a configuration in which the detected value of rotation detection sensor 410 is input to only engine ECU 330 and engine rotation speed Ne calculated by engine ECU 330 is input to MG2-CPU 322 as shown by a dotted line in FIG. 12. In such a configuration, using engine rotation speed Ne calculated by engine ECU 330 and MG1 rotation speed Nm1 calculated by MG1-CPU 321, calculation and estimation of MG2 rotation speed Nm2 is performed in accordance with the equation (6) in MG2-CPU 312. Therefore, due to a difference in timing between engine rotation speed Ne and MG1 rotation speed Nm1, an error may occur in estimated MG2 rotation speed Nme2 and estimated electric angle θe.

In contrast, in the second embodiment, the MG2 rotation speed used for estimation of the electric angle is estimated using engine rotation speed Ne and MG1 rotation speed Nm1 calculated based on the detected values of resolver 421 and rotation detection sensor 410 that are input to the common processing unit (CPU). As a result, the accuracy of estimation of the MG2 rotation speed can be increased, and thus, the electric angle estimation error in the resolverless control can be suppressed. Consequently, the output of motor generator 20 can be accurately controlled during running of the vehicle when the resolver is abnormal.

Third Embodiment

In the first and second embodiments, description has been given to the resolverless control and running of the vehicle when an abnormality occurs in the resolver of motor generator 20, of motor generators 10 and 20. However, the resolverless control described in the first embodiment can also be similarly applied to the case in which an abnormality occurs in the resolver of motor generator 10 (MG1). Therefore, in a third embodiment, description will be given to the resolverless control and running of the vehicle when an abnormality occurs in the resolver of motor generator 10.

Namely, in the third embodiment, the output of motor generator 20 is controlled in accordance with the control configuration shown in FIG. 6, while the resolverless control shown in FIG. 7 is applied to motor generator 10 to control the output torque of motor generator 10.

Figure 13:
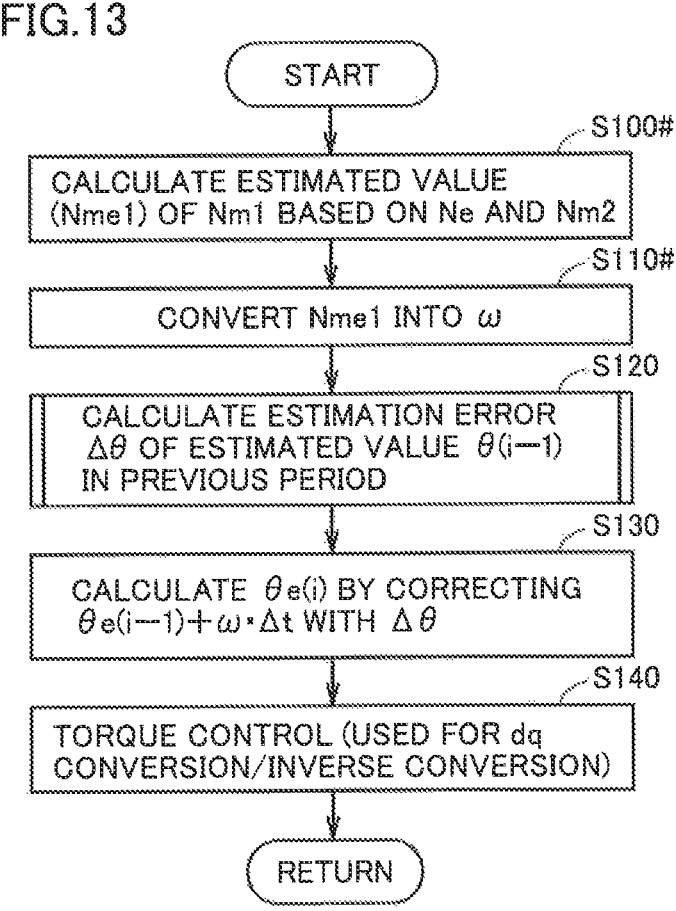
FIG. 13 is a flowchart for describing a control process by an electric angle estimation unit in the resolverless control according to a third embodiment.

FIG. 13 shows a flowchart for describing a control process by the electric angle estimation unit (FIG. 7) in the resolverless control according to the third embodiment.

Comparing FIG. 13 with FIG. 8, in the third embodiment, electric angle estimation unit 600 (ECU 300) performs the processing in steps S100# and S110# instead of steps S100 and S110 in FIG. 8. In step S100#, using engine rotation speed Ne and MG2 rotation speed Nm2 obtained from the detected values of rotation detection sensor 410 and resolver 422, an estimated value of MG1 rotation speed Nm1 (estimated MG1 rotation speed Nme1) is calculated in accordance with the following equation (15) obtained by modifying the equation (1) premised on Gr=1:

$$Nme1=(Ne \cdot (1+\rho)-Nm2)/\rho \quad (15).$$

Similarly, in step S110#, estimated MG1 rotation speed Nme1 obtained in step S100# is converted into rotation angle speed ω.

Since subsequent steps S120 to S140 are the same as those in FIG. 7, detailed description will not be repeated. As a result, estimated electric angle θe of motor generator 10 can be calculated for each control period in accordance with rotation angle speed ω based on estimated MG1 rotation speed Nme1. At this time, correction is made based on calculation of electric angle estimation error Δθ shown in FIG. 10 and the electric angle of motor generator 10 can also be estimated similarly to the electric angle of motor generator 20 in the first embodiment.

Therefore, even when an abnormality occurs in the resolver of motor generator 10, the output of motor generator 10 can be controlled in accordance with torque command value Tqcom1, by applying the resolverless control including estimation of the electric angle in accordance with the configuration shown in FIG. 7. In this case as well, torque command value Tqcom1 can be set at a positive value (Tqcom1>0), a negative value (Tqcom1<0) or the zero torque.

As described in Japanese Patent Laying-Open No. 2007-244126, running of the vehicle when an abnormality occurs in the resolver of motor generator 10 can be implemented by the EV running (FIG. 3), with inverter 221 being shut down. However, when the EV running is continued, the running distance is limited by the discharging margin (SOC) of battery 150.

In contrast, in the third embodiment, the resolverless control is applied to allow the torque output from motor generator 10. As a result, in response to a decrease in SOC of battery 150, the running mode can be shifted to the HV running (FIG. 4) with actuation of engine 100, and thereby, running of the vehicle can be continued. Specifically, the output torque of motor generator 10 can be controlled such that in response to a decrease in SOC, torque command value Tqcom1 is set to be Tqcom1>0 and engine 100 is cranked, and after startup of engine 100, torque command value Tqcom1 is set to be Tqcom1<0 and motor generator 10 generates electric power by using the output of engine 100. As a result, the running distance for running of the vehicle when an abnormality occurs in the resolver of motor generator 10 can be increased, as compared with the case of continuing running with the torque output from motor generator 10 being stopped (i.e., no power generation) as described in Japanese Patent Laying-Open No. 2007-244126.

In the case of applying the resolverless control to motor generator 10 as well, the range (upper limit value) of the output torque of motor generator 10 can be limited by the test pattern (S240) before electric angle estimation error Δθ becomes small (during the determination of NO in S250), similarly to the modification (FIG. 11) of the first embodiment. For example, before the cranking torque for starting engine 100 is output, electric angle estimation error Δθ can be converged using the test pattern.

Furthermore, the distributed arrangement configuration of the ECUs described in the second embodiment can also be applied to the resolverless control according to the third embodiment.

FIG. 14 is a functional block diagram for describing a distributed arrangement configuration of ECUs corresponding to the resolverless control according to the third embodiment.

In FIG. 14 as well, the arrangement of ECU 300 divided into HV-ECU 310, MG-ECU 320 (MG1-CPU 321 and MG2-CPU 322) and engine ECU 330 as well as the input and output relationship of the signals and the information in the ECUs and the CPUs are the same as those in FIG. 12, and thus, detailed description will not be repeated. Namely, the output control (resolverless control) over motor generator 10 is executed by MG1-CPU 321 in accordance with torque command value Tqcom1 provided from MG2-CPU 322.

In the resolverless control according to the third embodiment, engine rotation speed Ne and MG2 rotation speed Nm2 required for estimation of the MG1 rotation speed are calculated by MG2-CPU 322, using the detected values of resolver 422 and rotation detection sensor 410. Engine rotation speed Ne and MG2 rotation speed Nm2 calculated by MG2-CPU 322 are then transmitted to MG1-CPU 321.

Using engine rotation speed Ne and MG2 rotation speed Nm2 provided from MG2-CPU 322, MG1-CPU 321 calculates estimated MG1 rotation speed Nme1 in accordance with the equation (15). Namely, in the third embodiment, MG2-CPU 322 corresponds to "first processing unit".

Furthermore, MG1-CPU 321 executes the resolverless control (FIG. 7) using calculated estimated MG1 rotation speed Nme1, and thereby, generates control signal PWM1 of inverter 221. As a result, the output of motor generator 10 can be controlled in accordance with torque command value Tqcom1.

Therefore, in the third embodiment as well, by applying the distributed arrangement of the ECUs in FIG. 14, engine rotation speed Ne and MG2 rotation speed Nm2 are calculated based on the detected values of resolver 422 and rotation detection sensor 410 that are input to the common processing unit (CPU), and the MG1 rotation speed used for estimation of the electric angle is estimated based on calculated engine rotation speed Ne and MG2 rotation speed Nm2. As a result, the accuracy of estimation of the MG1 rotation speed can be increased, and thus, the electric angle estimation error in the resolverless control can be suppressed. Consequently, the output of motor generator 10 can be accurately controlled during running of the vehicle when the resolver is abnormal.

While the embodiments of the present invention have been described above, the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A hybrid vehicle comprising:
an engine;
a first motor generator and a second motor generator each including a rotor provided with a permanent magnet;
an output shaft mechanically connected to the rotor of the second motor generator and drive wheels;
a planetary gear device mechanically coupling a crankshaft of the engine, the rotor of the first motor generator and the output shaft;
first and second rotation angle sensors provided to the first motor generator and the second motor generator, respectively;
first and second current sensors provided to the first motor generator and the second motor generator, respectively;
a rotation detection sensor provided to the crankshaft;
first and second inverters that control an output of the first motor generator and an output of the second motor generator, respectively;
a power storage that transmits and receives electric power to and from the first motor generator and the second motor generator through the first and second inverters; and
an electronic control unit programmed to, in a running mode in which an abnormality occurs in one rotation angle sensor of the first and second rotation angle sensors and an other rotation angle sensor of the first and second rotation angle sensors is normal during running of the vehicle, control an output of one motor generator of the first motor generator and the second motor generator, wherein the one motor generator corresponds to the one rotation angle sensor, the electronic control unit being programmed to, during the running of the vehicle:
(i) periodically calculate an estimated rotation angle speed of the one motor generator based on a gear ratio in the planetary gear device, a detected value of the rotation detection sensor, and a detected value of the other rotation angle sensor of the first and second rotation angle sensors;
(ii) periodically calculate an estimated electric angle by integrating an estimated rotation angle change amount calculated from the estimated rotation angle speed; and
(iii) periodically generate a control command for one inverter of the first and second inverters which corresponds to the one motor generator, by use of the estimated electric angle,
the estimated electric angle being calculated in each period by correcting a sum of the estimated electric angle in a previous period and the estimated rotation angle change amount between the previous period and a present period, with an electric angle error calculated and estimated from the control command for the one inverter and a current value detected by one current sensor of the first and second current sensors which is provided to the one motor generator.

2. The hybrid vehicle according to claim 1, wherein during the running mode of the vehicle, in a period in which an absolute value of the electric angle error is greater than a prescribed value since a start of output control over the one motor generator, the electronic control unit is configured to set an upper limit value of output torque of the one motor generator to be smaller than the upper limit value after the absolute value of the electric angle error becomes smaller than the prescribed value.

3. The hybrid vehicle according to claim 2, wherein
the control device includes a plurality of processors,
a first processor of the plurality of processors receives outputs of the rotation detection sensor and the other rotation angle sensor, and calculates a rotation speed of the engine and a rotation speed an other motor generator of the first motor generator and the second motor generator, the other motor generator corresponding to the other rotation angle sensor, and
the estimated rotation angle speed of the one motor generator is calculated in any one of the plurality of processors by using the gear ratio as well as the rotation speed of the engine and the rotation speed of the other motor generator calculated by the first processor.

4. The hybrid vehicle according to claim 1, wherein
the control device includes a plurality of processors,
a first processor of the plurality of processors receives outputs of the rotation detection sensor and the other rotation angle sensor, and calculates a rotation speed of the engine and a rotation speed of an other motor generator of the first motor generator and the second motor generator, the other motor generator corresponding to the other rotation angle sensor, and
the estimated rotation angle speed of the one motor generator is calculated in any one of the plurality of processors by using the gear ratio as well as the rotation speed of the engine and the rotation speed of the other motor generator calculated by the first processor.

* * * * *